(12) United States Patent
Takemura et al.

(10) Patent No.: US 7,112,060 B2
(45) Date of Patent: *Sep. 26, 2006

(54) BURNER FOR TREATING WASTE GAS

(75) Inventors: Yoshiro Takemura, Fujisawa (JP);
Tetsuo Komai, Tokyo (JP); Kotaro Kawamura, Tokyo (JP); Takeshi Tsuji, Tokyo (JP); Kazutaka Okuda, Tokyo (JP); Rikiya Nakamura, Tokyo (JP); Keiichi Ishikawa, Tokyo (JP); Tomonori Ohashi, Tokyo (JP); Yasutaka Muroga, Tokyo (JP); Tadakazu Nishikawa, Tokyo (JP); Yuji Shirao, Tokyo (JP); Hiroyuki Yamada, Fujisawa (JP)

(73) Assignee: Ebara Corporation, Tokyo (JP)

( * ) Notice: Subject to any disclaimer, the term of this patent is extended or adjusted under 35 U.S.C. 154(b) by 240 days.
This patent is subject to a terminal disclaimer.

(21) Appl. No.: 10/821,980

(22) Filed: Apr. 12, 2004

(65) Prior Publication Data
US 2004/0191142 A1 Sep. 30, 2004

Related U.S. Application Data

(62) Division of application No. 10/111,382, filed as application No. PCT/JP00/07691 on Nov. 1, 2000, now Pat. No. 6,736,635.

(30) Foreign Application Priority Data

| Nov. 2, 1999 | (JP) | 11-312762 |
| Sep. 27, 2000 | (JP) | 2000-294632 |
| Oct. 2, 2000 | (JP) | 2000-302410 |
| Oct. 2, 2000 | (JP) | 2000-302411 |

(51) Int. Cl.
*F23G 7/06* (2006.01)
*F23D 14/10* (2006.01)

(52) U.S. Cl. ............ 431/353; 431/173; 431/185; 431/5; 239/428; 239/434; 239/422; 110/213

(58) Field of Classification Search ............ 431/353, 431/9, 5, 8, 10, 158, 202, 173, 182, 185; 110/213, 214; 422/182, 183; 239/422, 424, 239/424.5, 425, 426, 428, 434, 405, 549
See application file for complete search history.

(56) References Cited

U.S. PATENT DOCUMENTS

| 3,195,608 | A | | 7/1965 | Voorheis et al. |
| 3,837,813 | A | | 9/1974 | Ebeling et al. |
| 3,985,494 | A | | 10/1976 | Childree |
| 4,154,567 | A | | 5/1979 | Dahmen |
| 4,218,426 | A | | 8/1980 | Dahmen |
| 4,392,816 | A | | 7/1983 | Berlie et al. |
| 4,815,966 | A | | 3/1989 | Janssen |
| 4,859,173 | A | | 8/1989 | Davis et al. |
| 4,915,038 | A | * | 4/1990 | Sujata et al. ............ 431/215 |
| 5,009,174 | A | | 4/1991 | Polak |
| 5,310,334 | A | | 5/1994 | Spiros |
| 5,676,536 | A | | 10/1997 | Ruhl et al. |
| 5,766,000 | A | | 6/1998 | Thompson |
| 5,900,217 | A | | 5/1999 | Hartung et al. |
| 6,736,635 | B1 | * | 5/2004 | Takemura et al. ............ 431/353 |

FOREIGN PATENT DOCUMENTS

| DE | 3916567 A1 | | 11/1989 |
| EP | 0 819 887 A2 | | 1/1998 |
| EP | 0 942 231 A1 | | 9/1999 |
| JP | 52-107634 | | 9/1977 |
| JP | 11-82979 | | 7/1989 |
| JP | 09/021516 | | 1/1997 |
| JP | 9-21516 | | 1/1997 |
| JP | 10-9551 | | 1/1998 |
| JP | 10-510914 | | 10/1998 |
| JP | 11-218317 | | 8/1999 |
| JP | 2002-106813 A | * | 4/2002 |
| WO | WO 98/06977 | | 2/1998 |
| WO | WO 99/27301 | | 6/1999 |

* cited by examiner

Primary Examiner—Josiah C. Cocks
(74) Attorney, Agent, or Firm—Westerman, Hattori, Daniels & Adrian, LLP.

(57) ABSTRACT

The present invention provides a burner for use in a combustion-type waste gas treatment system for combusting waste gases emitted from semiconductor manufacturing system, particularly, a deposition gas containing $SiH_4$ and a halogen-base gas, simultaneously at a high efficiency of destruction, making it difficult for a powder of $SiO_2$ to be attached and deposited, performing a low-NOx combustion, and maintaining a desired level of safety. The combustion-type waste gas treatment system has a flame stabilizing zone (15), which is open toward a combustion chamber (11), surrounded by a peripheral wall (12), and closed by a plate (14) remotely from the combustion chamber. A waste gas, an auxiliary combustible agent, and air are introduced into and mixed with each other in the flame stabilizing zone (15), and the mixed gases are ejected toward the combustion chamber (11) perpendicularly to the plate (14).

15 Claims, 18 Drawing Sheets

F I G. 20
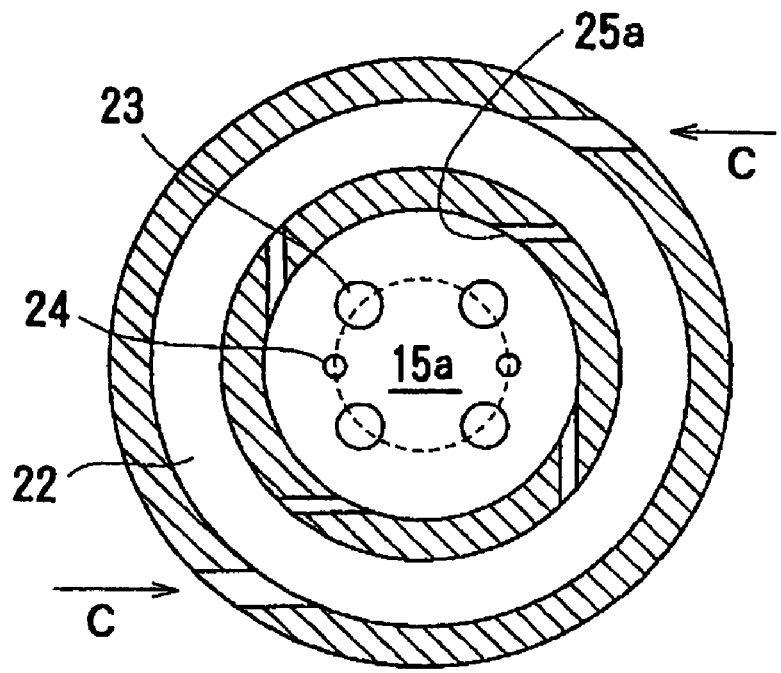
F I G. 21
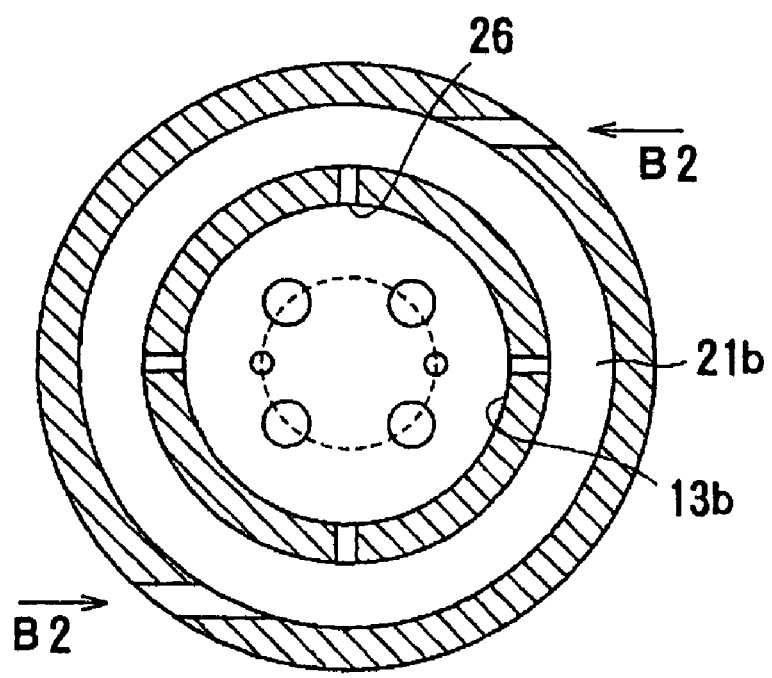

fuel gas

BURNER FOR TREATING WASTE GAS

This is a divisional application of U.S. Ser. No. 10/111,382, filed May 1, 2002 now U.S. Pat. No. 6,736,635.

TECHNICAL FIELD

The present invention relates to a waste gas treating burner for use in a combustion-type waste gas treatment system for combusting harmful waste gases such as a deposition gas containing $Si_4$ and a halogen-base gas ($CHF_3$, $C_2F_6$, $CF_4$, etc.), which are emitted from semiconductor manufacturing system.

BACKGROUND ART

Semiconductor manufacturing system emits harmful waste gases such as a deposition gas containing $SiH_4$ and a halogen-base gas ($CHF_3$, $C_2F_6$, $CF_4$, etc.), which should not be discharged directly into the atmosphere. It is therefore the general practice in the art to introduce such harmful waste gases into an abatement system where the waste gas is detoxified by way of combustion. According to the general waste gas treatment system, an auxiliary combustible gas is used to produce flames in a furnace for thereby combusting the waste gases.

In the combustion-type waste gas treatment system, the auxiliary combustible gas is usually in the form of a combination of a fuel gas such as hydrogen, a town gas, LPG, etc. and an oxidizing agent such as oxygen or air. Most of the operating cost of the combustion-type waste gas treatment system constitutes expenses required by the consumption of the fuel gas and the oxidizing agent. One of the indicators of the performance of combustion-type waste gas treatment system is how much harmful waste gases can be destroyed with a high efficiency with a small amount of auxiliary combustible gas. It is known in the art that when the deposition gas containing $SiH_4$ is thermally destroyed, a powder of $SiO_2$ is generated which tends to be deposited in the combustion chamber and cause various troubles to the combustion chamber. Consequently, a design approach to make the combustion chamber resistant to the deposition therein of a powder of $SiO_2$ is also an important element in evaluating the combustion-type waste gas treatment system.

One general burner for use in conventional combustion-type waste gas treatment system is shown in FIGS. 28 and 29 of the accompanying drawings. As shown in FIGS. 28 and 29, the burner has a waste gas nozzle 2 defined centrally in the ceiling of a cylindrical combustion chamber 1, for introducing a waste gas A to be treated into the combustion chamber 1, and a plurality of auxiliary combustible gas nozzles 3 defined in the ceiling of the cylindrical combustion chamber 1 around the waste gas nozzle 2, for introducing an auxiliary combustible gas B into the combustion chamber 1, with a combustion gas outlet 4 integrally joined to the lower end of the combustion chamber 1. The auxiliary combustible gas B ejected from the auxiliary combustible gas nozzles 3 produces flames in a circular pattern. While the waste gas A passes centrally through the circular pattern of flames, the waste gas A is mixed with and combusted by the flames, emitting a combustion exhaust gas which is discharged out of the combustion chamber 1 through the combustion gas outlet 4.

With the conventional burner, however, since the flames produced by the auxiliary combustible gas are formed in front of the auxiliary combustible gas nozzles, the waste gas discharged forward from the waste gas nozzle which is positioned inwardly of the auxiliary combustible gas nozzles is not necessarily sufficiently mixed with the flames, and hence the efficiency of destruction of the waste gas is not sufficiently high. In order to increase the efficiency of destruction, it is necessary to increase the amount of auxiliary combustible gas to produce large flames, which allow the waste gas to be easily combusted and destroyed. However, the amount of auxiliary combustible gas, which does not contribute to the destruction of the waste gas is also increased, resulting in an increase in the operating cost of the combustion-type waste gas treatment system.

When a $SiH_4$ gas is destroyed by way of oxidization, a produced powder of $SiO_2$ is attached to and deposited on wall surfaces where the exhaust gas flows slowly. If the concentration of $SiH_4$ in the waste gas is high, then the powder of $SiO_2$ is produced and deposited in an increased quantity on the wall surfaces. In worst cases, an auxiliary combustible gas may not be continuously combusted, and it may be necessary to shut off the combustion-type waste gas treatment system for removal of the deposited powder.

DISCLOSURE OF THE INVENTION

The present invention has been made in view of the above difficulties. It is an object of the present invention to provide a burner for use in a combustion-type waste gas treatment system which is capable of destructing waste gases, particularly, a deposition gas containing $SiH_4$ and a halogen-base gas, from a semiconductor fabrication facility simultaneously at a high efficiency of destruction, making it difficult for a powder of $SiO_2$ to be attached and deposited, performing a low-NOx combustion, and maintaining a desired level of safety.

According to the present invention, there is provided a burner for treating a waste gas, characterized in that a flame stabilizing zone is open toward a combustion chamber, surrounded by a peripheral wall, and closed by a plate remotely from the combustion chamber, and a waste gas, an auxiliary combustible agent, and air are introduced into and mixed with each other in the flame stabilizing zone, and the mixed gases are ejected toward the combustion chamber perpendicularly to the plate. Preferably, the plate has, defined therein, a waste gas flame hole for ejecting the waste gas toward the flame stabilizing zone and an auxiliary combustible gas flame hole for ejecting the auxiliary combustible gas, and the peripheral wall of the flame stabilizing zone has an air ejection nozzle arranged to eject the air substantially circumferentially to produce a swirling flow.

The waste gas including a deposition gas and a halogen-base gas, the auxiliary combustible agent, and the air are introduced into the flame stabilizing zone, which is open toward the combustion chamber, and sufficiently mixed with each other. The mixed gases remain sufficiently mixed without being dispersed, and are ejected toward the combustion chamber perpendicularly to the plate. Combustion flames produced in the combustion chamber become elongate flames, expanding a high-temperature region downstream to increase the period of time in which the waste gas remains in the high-temperature region. Therefore, the waste gas is well combusted with a high efficiency of destruction, and a powder of $SiO_2$, which is produced, is efficiently discharged by a flow of combustion gas.

The air ejected substantially circumferentially from the peripheral wall produces a strong swirling flow. The swirling flow has a vortex center of the swirling air and a free vortex region around the vortex center. Since the flame holes for the waste gas and the auxiliary combustible gas are defined in the plate, the waste gas and the auxiliary combustible gas which are ejected from the flame holes are introduced into the free vortex region and engulfed by the swirling air flow. The waste gas and the auxiliary combustible gas, which are ejected from the flame holes, are sheared due to changes in the speed of the swirling air flow by the free vortex region of the swirling air flow, and sufficiently mixed with the air, and the mixture of the waste gas, the auxiliary combustible gas, and the air produces swirling flames. Because the auxiliary combustible gas and the air are combusted after being mixed in the swirling air flow, they produce pre-mixed flames to achieve a low-NOx combustion. Since the auxiliary combustible agent and the air are mixed in the flame stabilizing zone, the auxiliary combustible agent is not ignited in the gas chamber, making the burner highly safe, even when the peripheral wall of the flame stabilizing zone is heated by the flames.

Preferably, a second auxiliary combustible gas flame hole for ejecting the auxiliary combustible gas is defined in the peripheral wall of the flame stabilizing zone downstream of the air ejection nozzle in an axial direction of the flame stabilizing zone.

Flames produced by the auxiliary combustible gas are positioned downstream of the second auxiliary combustible gas flame hole, and are combined flames from the primary combustion, producing elongate flames. The elongate flames expand a high-temperature region downstream to increase the period of time in which the waste gas remains in the high-temperature region. By thus expanding the flame-induced high-temperature region downstream, the halogen-base waste gas in particular can fully be destroyed.

The air ejection nozzle preferably comprises air ejection nozzles in a plurality of groups divided along the axial direction of the flame stabilizing zone.

When the air is divided in a plurality of groups and supplied to the flame stabilizing zone, the amount of air ejected from each of the groups is small. At the inlet of the flame stabilizing zone, the amount of air required to combust the auxiliary combustible gas is insufficient, producing fuel-rich flames, suppressing the generation of NOx. At the outlet of the flame stabilizing zone, a sufficient amount of air is supplied to produce fuel-lean flames, causing a low-NOx combustion. Flames produced by the air ejected from the air ejection nozzles in the plural groups become elongate flames. The elongate flames expand a high-temperature region downstream to increase the period of time in which the waste gas remains in the high-temperature region, thus fully destructing the halogen-base waste gas in particular.

The flame stabilizing zone preferably is of a cylindrical shape. If an air ejection nozzle for ejecting air substantially circumferentially is combined with the flame stabilizing zone, then a swirling air flow can easily be produced in the flame stabilizing zone.

In a burner according to a second aspect of the present invention, a second flame stabilizing zone is disposed downstream in the axial direction of the flame stabilizing zone, and has, defined in a peripheral wall thereof, a second auxiliary combustible gas flame hole for ejecting a second auxiliary combustible gas, and a combustion chamber is disposed downstream of the second auxiliary combustible gas flame hole in an axial direction of the second flame stabilizing zone.

With the above arrangement, primary pre-mixed fuel-lean flames are produced downstream of the flame stabilizing zone, and then the auxiliary combustible gas is ejected from the second flame stabilizing zone to produce secondary high-temperature low-oxygen flames downstream thereof.

Therefore, a deposition gas containing $SiH_4$ and a halogen-base gas can simultaneously be destroyed with a high efficiency, and a powder of $SiO_2$, which is produced, can efficiently be discharged by a flow of combustion gas. Consequently, the powder of $SiO_2$ is prevented from being deposited in the combustion chamber.

BRIEF DESCRIPTION OF DRAWINGS

FIG. 20 is a cross-sectional view taken along line III—III of FIG. 19;

FIG. 21 is a cross-sectional view taken along line IV—IV of FIG. 19;

BEST MODE FOR CARRYING OUT THE INVENTION

A first aspect of the present invention will be described below with reference to FIGS. 1 through 6.

Figure 1:
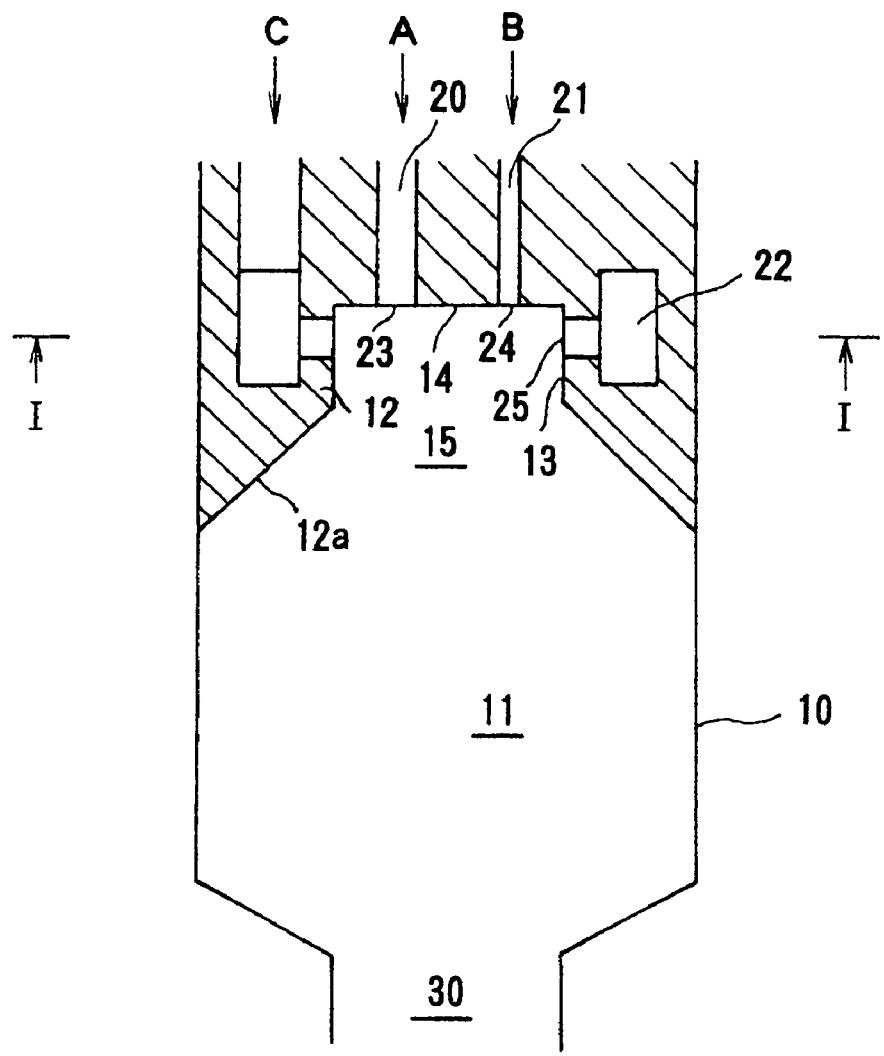
FIG. 1 is a longitudinal cross-sectional view showing a first embodiment of the present invention.
Figure 2:
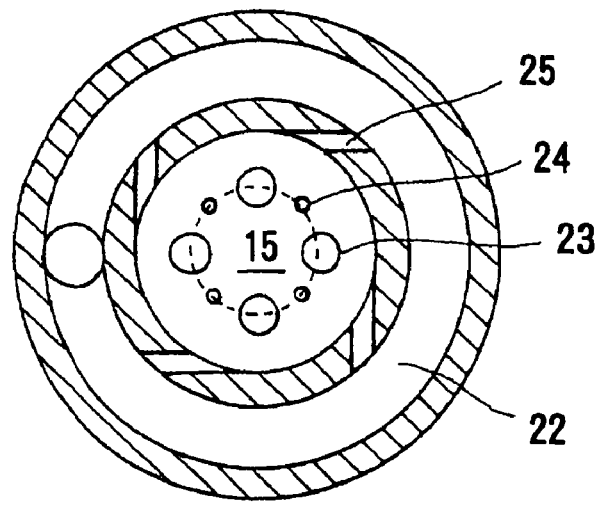
FIG. 2 is a cross-sectional view taken along line I—I of FIG. 1.

FIGS. 1 and 2 show a first embodiment of the present invention. A combustion chamber 11 is surrounded by a furnace wall 10. The combustion chamber 11 is confronted to a flame stabilizing zone 15, which is surrounded by a peripheral wall 13 defined by an inner peripheral surface of a cylindrical body 12 and closed by a plate 14. The cylindrical body 12 is integrally formed with the plate 14.

In the plate 14, there are defined a plurality of (four as shown) waste gas chambers 20 for holding and guiding a waste gas A to be treated which is mainly composed of nitrogen and contains a halogen-base gas emitted from a semiconductor fabrication facility, for example, and a plurality of (four as shown) auxiliary combustible gas chambers 21 for holding and guiding an auxiliary combustible gas B which is a fuel gas such as hydrogen, a town gas, LPG, etc. An air chamber 22 for holding and guiding air C is defined in the cylindrical body 12, which extends from the plate 14.

The plate 14 has, defined in a lower surface thereof, a plurality of waste gas flame holes 23 extending from the waste gas chambers 20 and opening toward the flame stabilizing zone 15, and a plurality of auxiliary combustible gas flame holes 24 providing communication between the auxiliary combustible gas chambers 21 and the flame stabilizing zone 15. The waste gas flame holes 23 and the auxiliary combustible gas flame holes 24 are arranged in a doughnut-shaped pattern. The doughnut-shaped pattern means that the auxiliary combustible gas flame holes 24 are disposed adjacent to the waste gas flame holes 23 in a substantially circumferential pattern substantially around the center of the plate 14 that defines the flame stabilizing zone. In the present embodiment, the waste gas flame holes 23 and the auxiliary combustible gas flame holes 24 are positioned alternately with each other on an annular shape. The annular shape is in same position with a free vortex region of a swirling air flow, in which a high speed region of the swirling air flow is formed, as described later on. The inner peripheral wall 13 of the cylindrical body 12 has a plurality of air ejection nozzles 25 providing communication between the air chamber 22 and the flame stabilizing zone 15. The air ejection nozzles 25 extend substantially tangentially to the circumferential surface of the flame stabilizing zone 15 for producing and ejecting a swirling flow of air C substantially circumferentially toward the flame stabilizing zone 15 (see FIG. 2).

The cylindrical body 12 also has a conical surface 12a extending conically from the peripheral wall 13 and joined to a side surface of the combustion chamber 11, partly making up the combustion chamber 11. A combustion gas outlet 30 is integrally joined to the lower end of the combustion chamber 11.

Operation of the present embodiment will be described below.

The air C is guided into and held by the air chamber 22, and ejected substantially circumferentially as a strong swirling flow from the air ejection nozzles 25 defined in the inner circumferential surface of the cylindrical body 12 into the flame stabilizing zone 15. The waste gas A is guided into and held by the waste gas chambers 20, and ejected from the waste gas flame holes 23 defined in the lower surface of the plate 14 into the flame stabilizing zone 15. The auxiliary combustible gas B is guided into and held by the auxiliary combustible gas chambers 21, and ejected from the auxiliary combustible gas flame holes 24 defined in the lower surface of the plate 14 into the flame stabilizing zone 15. After having been ejected from the flame holes, the auxiliary combustible gas B is immediately combined with the waste gas A ejected from the adjacent holes, and then mixed with the swirling air flow. When ignited by an ignition source, not shown, the mixed gases produce swirling flames along the inner circumferential surface of the cylindrical body 12.

The air ejected substantially circumferentially from the peripheral wall produces a strong swirling flow. The swirling flow has a vortex center therein swirling together with the swirling flow and a doughnut-shape free vortex region around the vortex center with the flow speed being lower toward the outer edge of the doughnut-shape free vortex zone. Since the flame holes for the waste gas A and the auxiliary combustible gas B are defined in the lower surface of the plate 14 in an annular shape in same position with a free vortex region, the waste gas A and the auxiliary combustible gas B are ejected into the free vortex region and engulfed by the swirling air flow. These gases are sheared due to changes in the speed of the swirling air flow, and sufficiently mixed with the air C. The mixture of the waste gas A, the auxiliary combustible gas B, and the air C produces swirling flames. Because the mixture produces flames after the waste gas A is sufficiently mixed in its entirety with the auxiliary combustible gas B and the air C, the waste gas A is fully exposed to the flames and progressively destroyed by way of combustion with a high efficiency of destruction.

Although the auxiliary combustible gas B and the air C are separately blown into the flame stabilizing zone 15, since the waste gas A is combusted after it is mixed with the auxiliary combustible gas A and the air C, pre-mixed flames are produced to achieve a low-NOx combustion. Pre-mixed flames are produced only when a fuel gas is sufficiently mixed with air prior to combustion, and can be achieved when the fuel gas is ejected from positions on the doughnut-shape pattern on the plate into the free vortex region where the swirling air flow has a high speed, as is the case with the present invention. Inasmuch as the auxiliary combustible gas B which is the fuel gas and the air C are mixed with each other in the flame stabilizing zone, the auxiliary combustible gas B is not ignited in the auxiliary combustible gas chambers 21, making the burner highly safe, even if the cylindrical body is heated by the flames.

The air ejected from the air ejection nozzles 25 into the combustion chamber 11 cools the cylindrical body 12 as follows: While the swirling flames heat the cylindrical body 12, it is necessary to cool the cylindrical body 12 to prevent its temperature from exceeding the heat-resistance temperature of the material of the cylindrical body 12 for keeping combustion. The air ejected from the air ejection nozzles 25 into the combustion chamber 11 acts to cool the surface of the peripheral wall 13 while mixing with the waste gas A and the auxiliary combustible gas B and swirling in the flame stabilizing zone 15.

Figure 3:
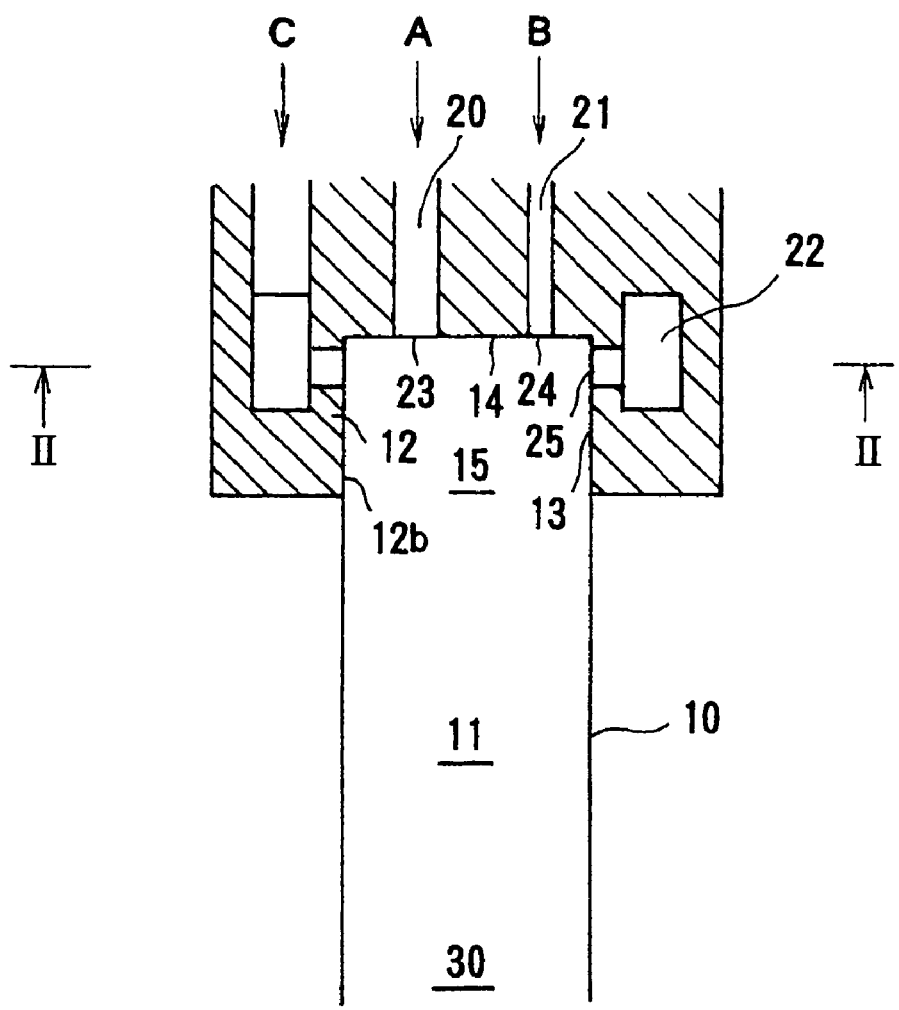
FIG. 3 is a longitudinal cross-sectional view showing a modification of the first embodiment of the present invention.
Figure 4:
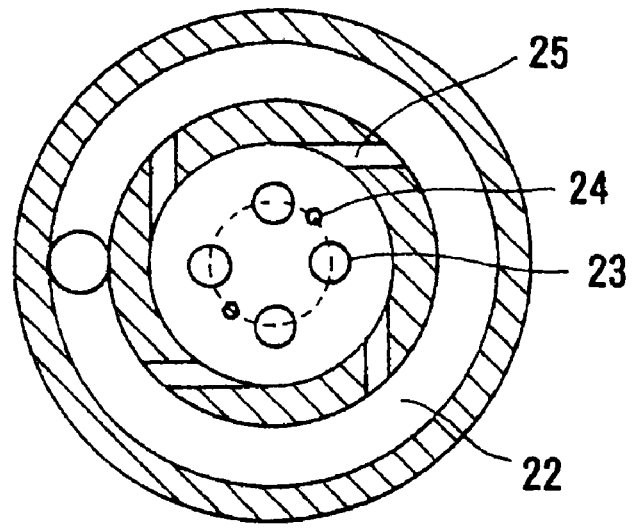
FIG. 4 is a cross-sectional view taken along line II—II of FIG. 3.

FIGS. 3 and 4 show a modification of the first embodiment of the present invention. According to this modification, the inside diameter of the cylindrical body 12 and the inside diameter of the combustion chamber 11 in the first embodiment are made substantially the same as each other. The conical surface 12a, which interconnects the peripheral wall 13 of the cylindrical body 12 and the side surface of the combustion chamber 11 according to the first embodiment is replaced with a cylindrical surface 12b. With this structure, the diameter of the swirling flow remains substantially the same to the outlet, maintaining a good swirling flow from the flame stabilizing zone to the outlet, so that any stagnant flow regions are eliminated and the mixing of the waste gas and the swirling flames is promoted to increase the efficiency of destruction of the waste gas.

In this modification, there are two auxiliary combustible gas chambers 21 and two auxiliary combustible gas flame holes 24, with the auxiliary combustible gas flame holes 24 being positioned adjacent to the four waste gas flame holes 23, i.e., between the respective pairs of the four waste gas flame holes 23. With this arrangement, the primary auxiliary combustible gas B is sufficiently mixed with the waste gas A, which is ejected from adjacent positions.

Figure 5:
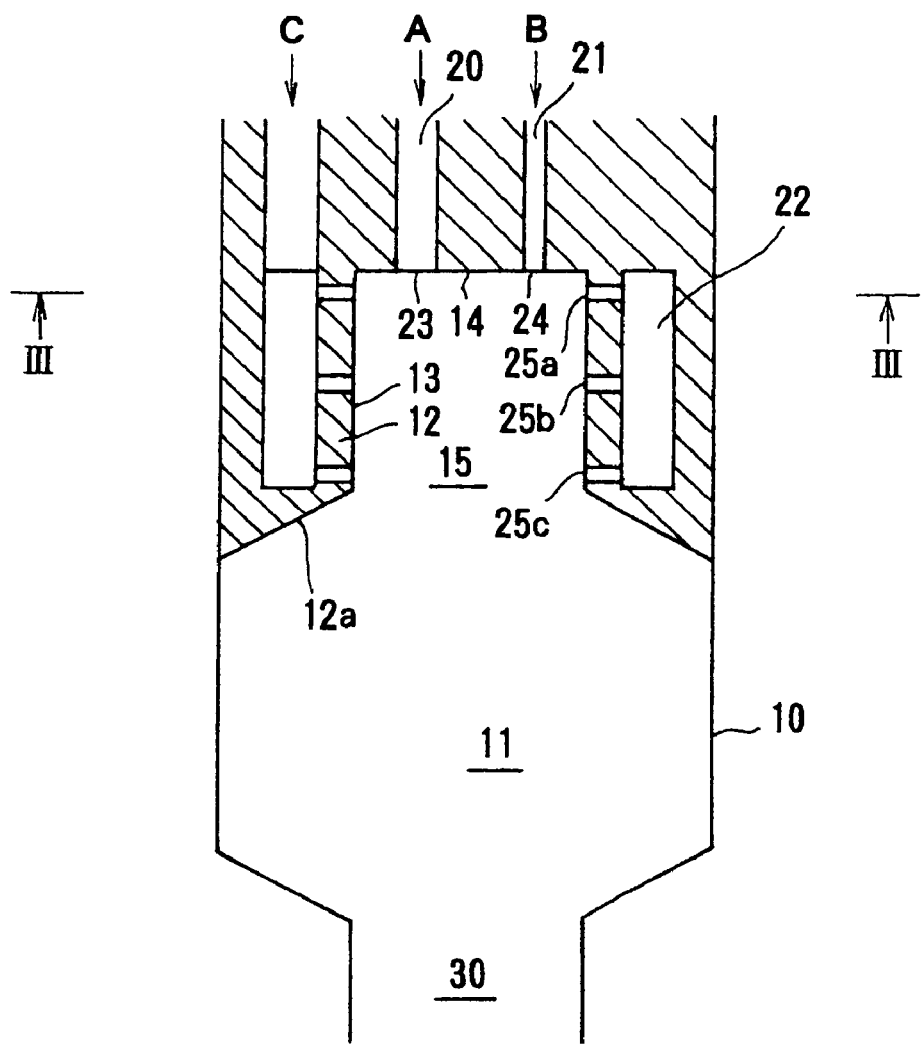
FIG. 5 is a longitudinal cross-sectional view showing another modification of the first embodiment of the present invention.
Figure 6:
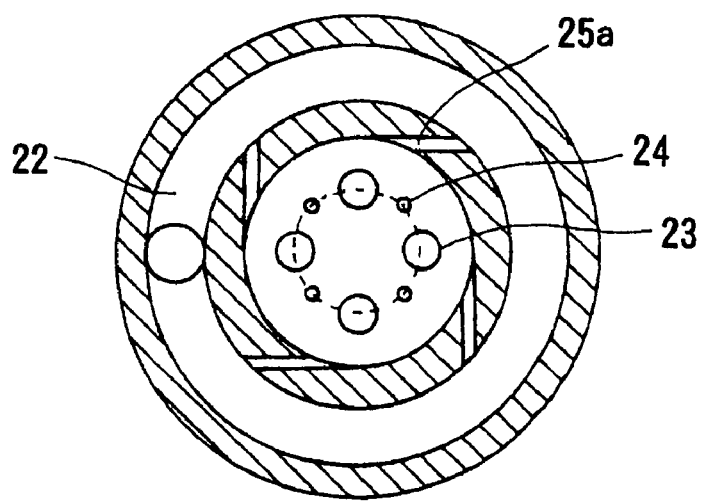
FIG. 6 is a cross-sectional view taken along line III—III of FIG. 5.

FIGS. 5 and 6 show another modification of the first embodiment of the present invention. In this modification, the air chamber 22 defined in the cylindrical body 12 extends substantially the full length in the axial direction of the peripheral wall 13 of the cylindrical body 12. The air ejection nozzles 25 which provide communication between the air chamber 22 and the flame stabilizing zone 15 are provided in four at a group in a circumferential surface. Specifically, the air ejection nozzles 25 are provided in three groups including a first group 25a defined in the peripheral wall closely to the plate, a second group 25b substantially at the center in the longitudinal direction of the peripheral wall, and a third group 25c defined in the peripheral wall at a position facing the combustion chamber. A combustion gas outlet 30 is integrally joined to the lower end of the combustion chamber 11.

Operation of the present modification will be described below.

The air ejected from the air chamber 22 into the flame stabilizing zone 15 is divided into three groups spaced along the axial direction of the peripheral wall 13. Usually, the total amount of supplied air is several or several tens times the amount of auxiliary combustible gas. When the air is divided into three stages along the axial direction and supplied to the flame stabilizing zone, the amount of air ejected from each of the groups is smaller than when the air is not divided, promoting the mixing of the air, the exhaust gas, and the auxiliary combustible gas to increase the efficiency of destruction. The amount of air ejected from the air ejection nozzles 25a, 25b in the first and second groups is not large enough to combust all the fuel gas, producing fuel-rich flames in the flame stabilizing zone to suppress the generation of NOx. When air is supplied from the third group of air ejection nozzles 25c, the sufficient amount of air is supplied to the fuel gas, producing fuel-lean flames to perform a low-NOx combustion.

Flames produced by the air ejected from the third group of air ejection nozzles 25c occur downstream of the air ejection nozzles 25c. Therefore, the flames become elongate frames, expanding the high-temperature region downstream to increase the period of time in which the waste gas remains high in temperature. With the flame-generated high-temperature region being expanded downstream, the halogen waste gas can fully be destroyed. The air ejection nozzles in the groups may not necessarily eject all air in a manner to produce a swirling air flow toward the flame stabilizing zone. For example, the third group of air ejection nozzles may eject air simply downstream, rather than tangentially to the circumferential surface, or may eject air toward the center of the flame stabilizing zone to cause turbulences with the waste gas and to be mixed with the waste gas.

Figure 7:
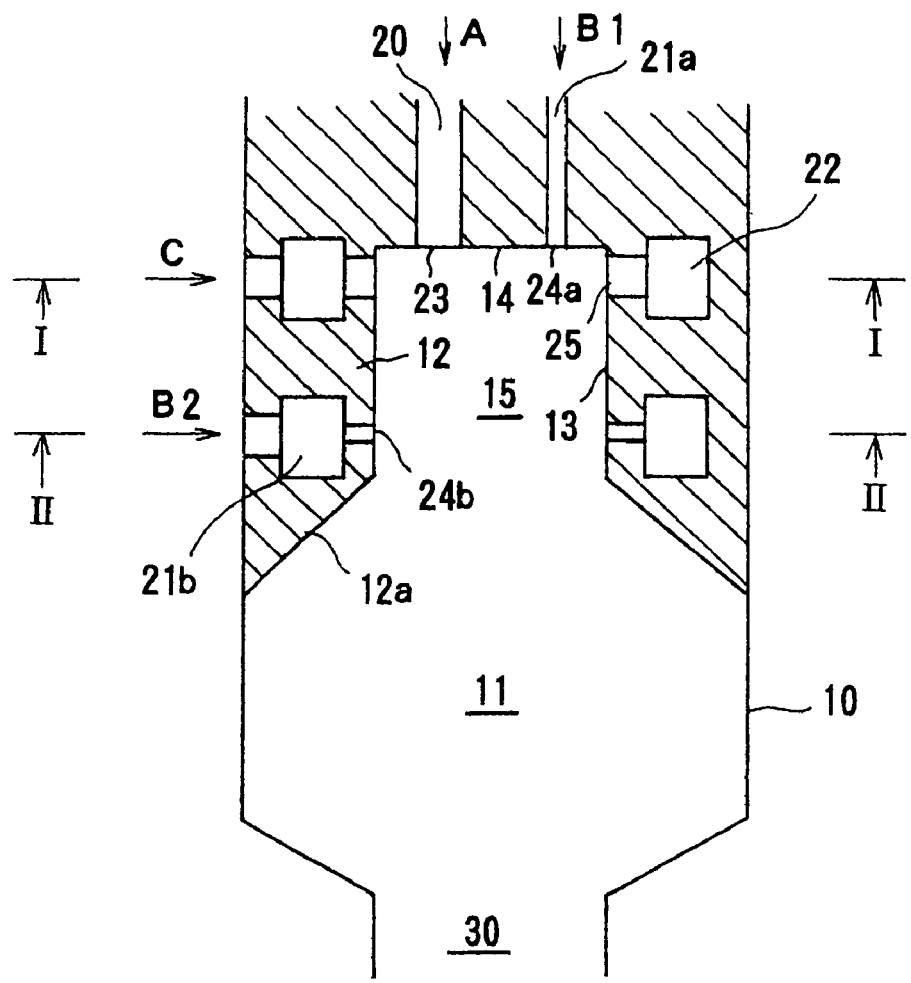
FIG. 7 is a longitudinal cross-sectional view showing a second embodiment of the present invention.
Figure 8:
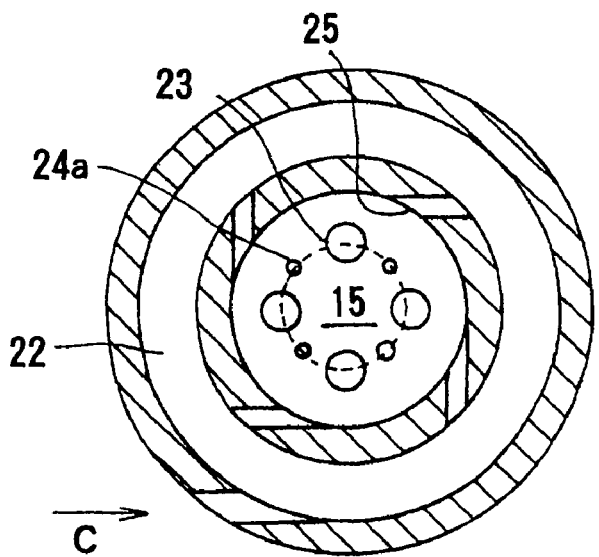
FIG. 8 is a cross-sectional view taken along line I—I of FIG. 7.
Figure 9:
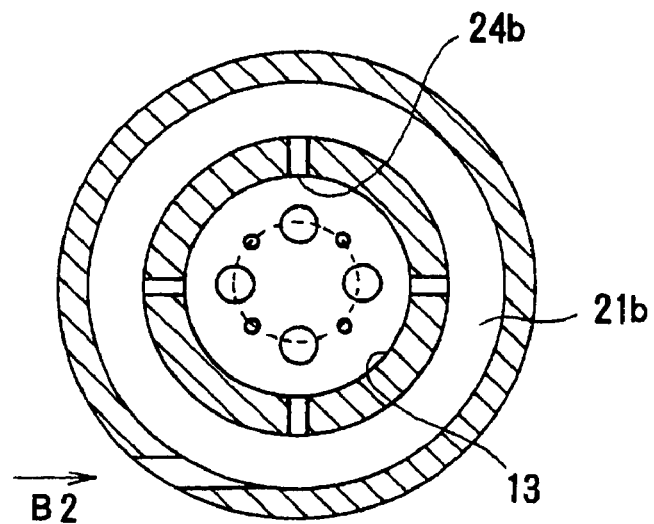
FIG. 9 is a cross-sectional view taken along line II—II of FIG. 7.

FIGS. 7, 8, and 9 show a second embodiment of the present invention. A combustion chamber 11 surrounded by a furnace wall 10 is confronted by a flame stabilizing zone 15, which is surrounded by a peripheral wall 13 defined by an inner circumferential surface of a cylindrical body 12 and closed by a plate 14. The cylindrical body 12 is integrally formed with the plate 14. In the plate 14, there are defined a plurality of (four as shown) waste gas chambers 20 for holding and guiding a waste gas A to be treated which is mainly composed of nitrogen and contains a halogen-base gas emitted from a semiconductor fabrication facility, for example, and a plurality of (four as shown) first auxiliary combustible gas chambers 21a for holding and guiding a primary auxiliary combustible gas B1 which is a fuel gas such as hydrogen, a town gas, LPG, etc. An air chamber 22 for holding and guiding air C and a second auxiliary combustible gas chamber 21b for holding and guiding a secondary auxiliary combustible gas B2 which is a fuel gas are defined in the cylindrical body 12 which extends from the plate 14. The second auxiliary combustible gas chamber 21b is positioned closer to the combustion chamber than the air chamber, i.e., downstream of the air chamber, in the axial direction of the flame stabilizing zone.

The plate 14 has, defined in a lower surface thereof, a plurality of waste gas flame holes 23 extending from the waste gas chambers 20 and opening toward the flame stabilizing zone 15, the waste gas flame holes 23 being smaller in diameter than the flame stabilizing zone 15, and a plurality of first auxiliary combustible gas flame holes 24a providing communication between the first auxiliary combustible gas chambers 21a and the flame stabilizing zone 15, the waste gas flame holes 23 and the first auxiliary combustible gas flame holes 24a being arranged in a doughnut-shaped pattern. The doughnut-shaped pattern means that the first auxiliary combustible gas flame holes 24a are disposed adjacent to the waste gas flame holes 23 in a substantially annular shape substantially around the center of the plate that defines the flame stabilizing zone. In the present embodiment, the waste gas flame holes 23 and the first auxiliary combustible gas flame holes 24a are positioned alternately with each other, and the annular shape is in same position with a free vortex region where a swirling air flow has a high speed, as described later on.

The inner peripheral wall 13 of the cylindrical body 12 has a plurality of air ejection nozzles 25 providing communication between the air chamber 22 and the flame stabilizing zone 15, and a plurality of second auxiliary combustible gas flame holes 24b positioned closer to the downstream combustion chamber than the air ejection nozzles 25 in the axial direction of the flame stabilizing zone. The air ejection nozzles 25 extend substantially tangentially to the circumferential surface of the flame stabilizing zone 15 for producing and ejecting a swirling flow of air C substantially circumferentially toward the flame stabilizing zone 15. The second auxiliary combustible gas flame holes 24b are arranged to eject a secondary auxiliary combustible gas B2 toward the center of the flame stabilizing zone 15.

Operation of the present embodiment will be described below.

The air C is guided into and held by the air chamber 22, and ejected substantially circumferentially as a strong swirling flow from the air ejection nozzles 25 defined in the inner circumferential surface of the cylindrical body 12 into the flame stabilizing zone 15. The waste gas A is guided into and held by the waste gas chambers 20, and ejected from the waste gas flame holes 23 defined in the lower surface of the plate 14 into the flame stabilizing zone 15. The primary auxiliary combustible gas B1 is guided into and held by the first auxiliary combustible gas chambers 21a, and ejected from the first auxiliary combustible gas flame holes 24a defined in the lower surface of the plate 14 into the flame stabilizing zone 15. The waste gas A and the primary auxiliary combustible gas B1 which are ejected are mixed with the swirling air flow. When ignited by an ignition source, not shown, the mixed gases produce swirling flames, which are primary flames, along the inner circumferential surface of the cylindrical body 12. The flow rate of the primary auxiliary combustible gas B1 is smaller than a theoretical equivalent to the flow rate of the air C, so that the produced primary flames are fuel-lean combustion flames characterized by the lean fuel.

The air ejected substantially circumferentially from the peripheral wall produces a strong swirling flow. The swirling flow has a vortex center swirling together with the swirling flow and a doughnut-shape free vortex region around the vortex center with the flow speed being lower toward the outer edge of the doughnut-shape free vortex region. Since the flame holes for the waste gas A and the primary auxiliary combustible gas B1 are defined in the lower surface of the plate 14 in an annular shape in same position with a free vortex region, the waste gas A and the primary auxiliary combustible gas B1 are ejected into the free vortex region and engulfed by the swirling air flow. These gases are sheared due to changes in the speed of the swirling air flow, and sufficiently mixed with the air C. The mixture of the waste gas A, the primary auxiliary combustible gas B1, and the air C produces swirling fuel-lean flames and causes a primary combustion. Although the primary auxiliary combustible gas B1 and the air C are separately blown into the flame stabilizing zone 15, since the waste gas is combusted after it is mixed with the primary auxiliary combustible gas and the air, pre-mixed flames are produced. Pre-mixed flames are produced only when a fuel gas is sufficiently mixed with air prior to combustion, and can be achieved when the fuel gas is ejected from positions on the doughnut-shape pattern on the plate into the free vortex region where the swirling air flow has a high speed, as is the case with the present invention. Pre-mixed flames cause a low-NOx combustion if they are fuel-lean flames. The pre-mixed flames produced in the present embodiment are flames where the fuel is lean, they cause a low-NOx combustion.

Then, the secondary auxiliary combustible gas B2 is ejected from the second auxiliary combustible gas flame holes 24b into the swirling flames as primary flames at the center of the flame stabilizing zone. The secondary auxiliary combustible gas B2 is well mixed with the primary flames due to a shearing action of the swirling primary flame flow, and oxidized by oxygen remaining in the primary flames, causing a secondary combustion. Since the concentration of the oxygen remaining in the primary flames is much lower than the concentration of oxygen contained in the air, a low-oxygen-concentration combustion takes place in the secondary combustion. In the low-oxygen-concentration combustion, NOx is produced in a small quantity, causing a low-NOx combustion. The flames produced by the secondary combustion are positioned downstream of the second auxiliary combustible gas flame holes 24b, and become elongate frames, expanding the high-temperature region downstream to increase the period of time in which the waste gas remains high in temperature. With the flame-generated high-temperature region being expanded downstream, the halogen waste gas can fully be destroyed.

While the low-NOx combustion is being achieved, all the waste gas A is sufficiently mixed with the primary auxiliary combustible gas B1, the secondary auxiliary combustible gas B2, and the air C due to the swirling air flow, and then produces downstream elongate flames. The waste gas A is fully exposed to the flames and progressively destroyed by way of combustion with a high efficiency of destruction.

Inasmuch as the primary and secondary auxiliary combustible gases B1, B2 which are the fuel gas and the air C are mixed with each other in the flame stabilizing zone, the auxiliary combustible gases are not ignited in the first and second auxiliary combustible gas chambers 21a, 21b, making the burner highly safe, even if the cylindrical body is heated by the flames. In the present embodiment, when the air C is supplied circumferentially to the air chamber 22, the air C swirls in the air chamber 22, uniformly cooling the air chamber 22 to prevent the cylindrical body from being heated. Similarly, when the secondary auxiliary combustible gas B2 is supplied circumferentially to the second auxiliary combustible gas chamber 21b, the secondary auxiliary combustible gas B2 swirls in the second auxiliary combustible gas chamber 21b, uniformly cooling the second auxiliary combustible gas chamber 21b.

Figure 10:
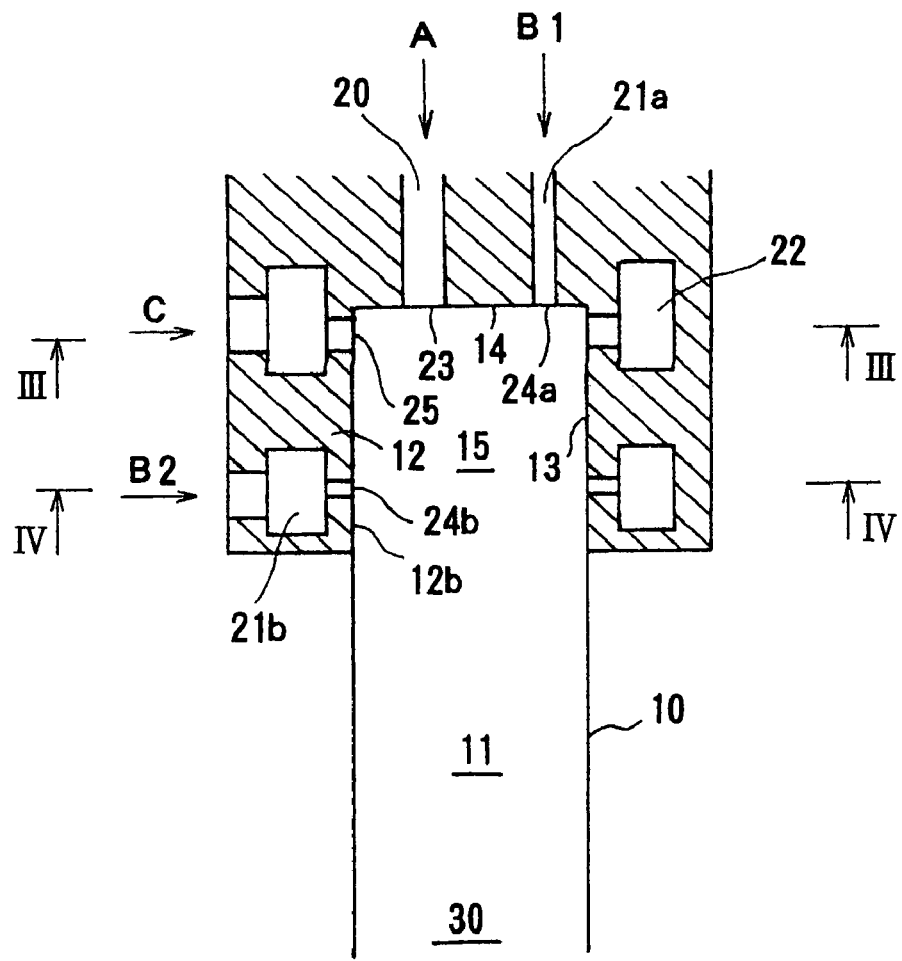
FIG. 10 is a longitudinal cross-sectional view showing a modification of the second embodiment of the present invention.
Figure 11:
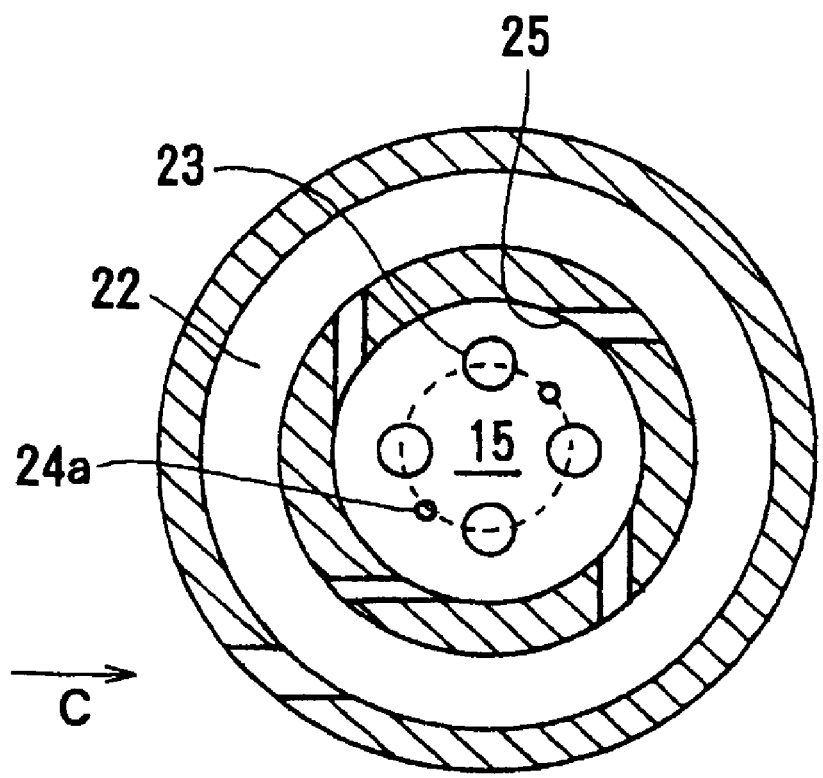
FIG. 11 is a cross-sectional view taken along line III—III of FIG. 10.
Figure 12:
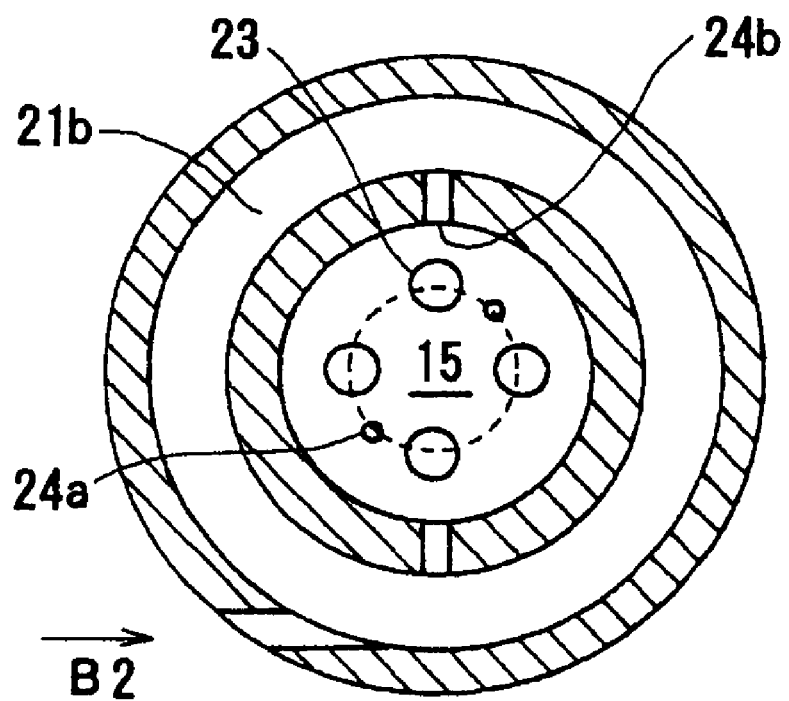
FIG. 12 is a cross-sectional view taken along line IV—IV of FIG. 10.

FIGS. 10, 11, and 12 show a modification of the second embodiment of the present invention. According to this modification, the inside diameter of the cylindrical body 12 and the inside diameter of the combustion chamber 11 in the second embodiment are made substantially the same as each other. The conical surface 12a, which interconnects the peripheral wall 13 of the cylindrical body 12 and the side surface of the combustion chamber 11, is replaced with a cylindrical surface 12b. With this structure, the diameter of the swirling flow remains substantially the same to the outlet, maintaining a good swirling flow from the flame stabilizing zone to the outlet, so that any stagnant flow regions are eliminated and the mixing of the waste gas and the swirling flames is promoted to increase the efficiency of destruction of the waste gas. In this modification, there are two primary auxiliary combustible gas chambers 21a and two primary auxiliary combustible gas flame holes 24a, with the primary auxiliary combustible gas flame holes 24a being positioned adjacent to the four waste gas flame holes 23, i.e., between the respective pairs of the four waste gas flame holes 23. With this arrangement, the primary auxiliary combustible gas B1 is sufficiently mixed with the waste gas A, which is ejected from adjacent positions of holes.

Figure 13:
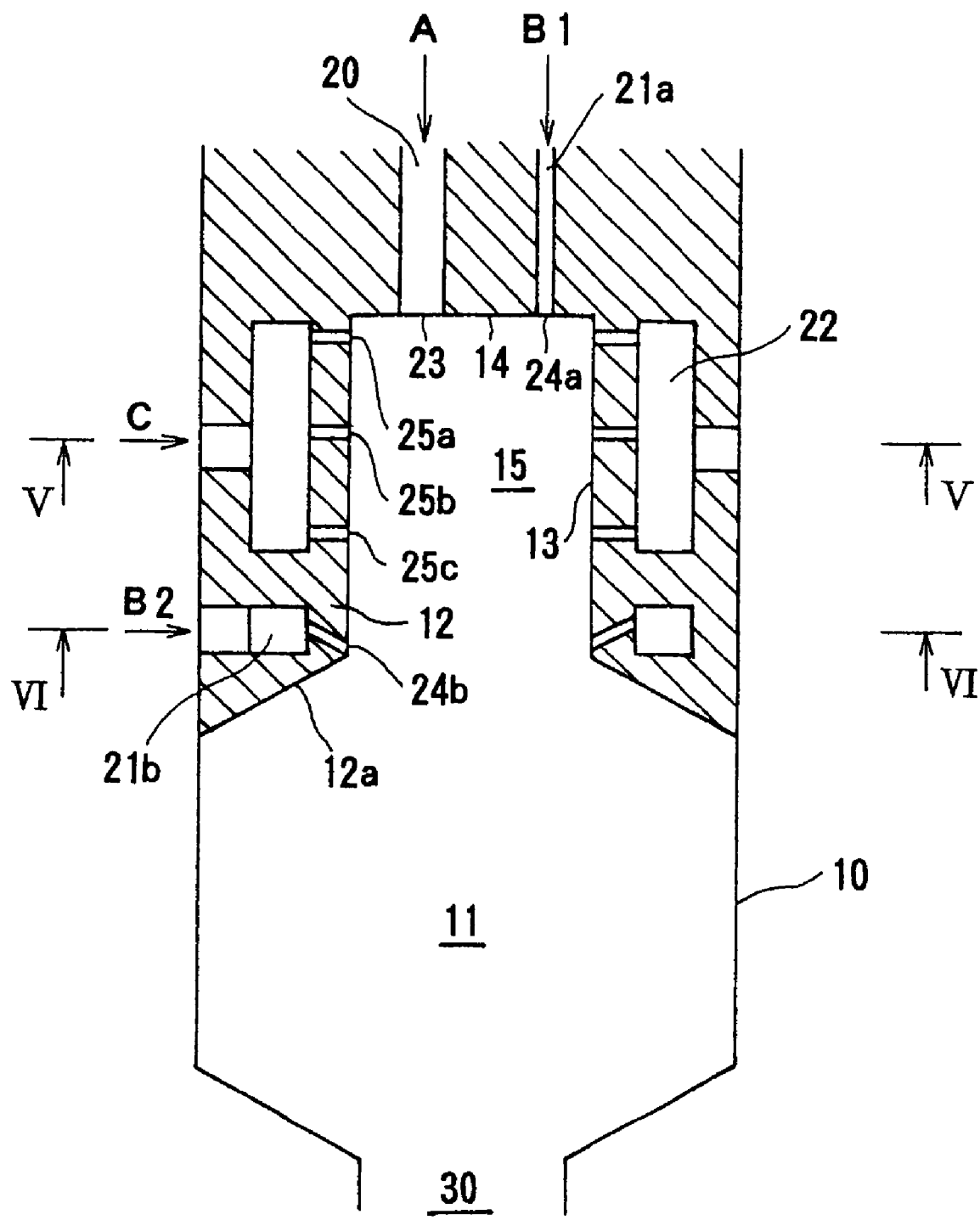
FIG. 13 is a longitudinal cross-sectional view showing another modification of the second embodiment of the present invention.
Figure 14:
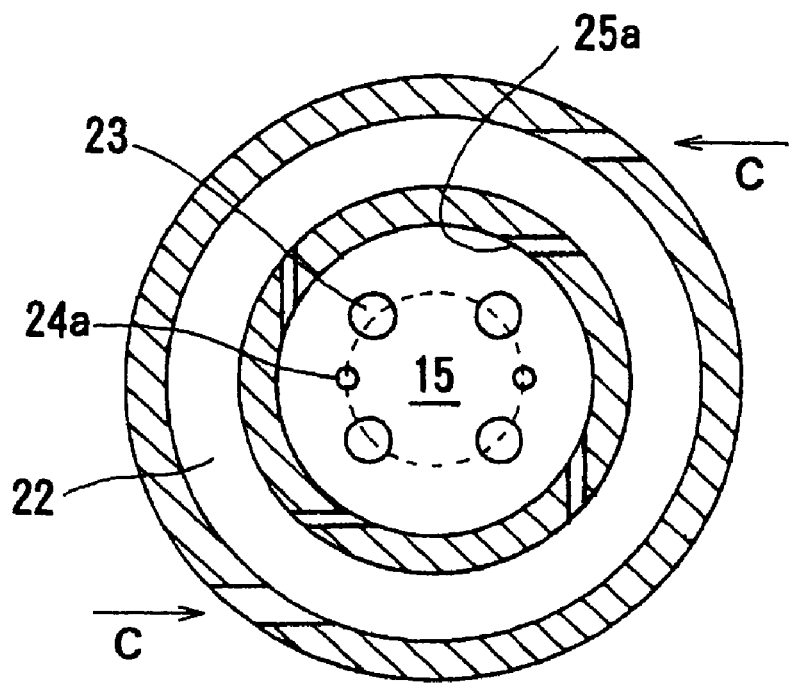
FIG. 14 is a cross-sectional view taken along line V—V of FIG. 13.
Figure 15:
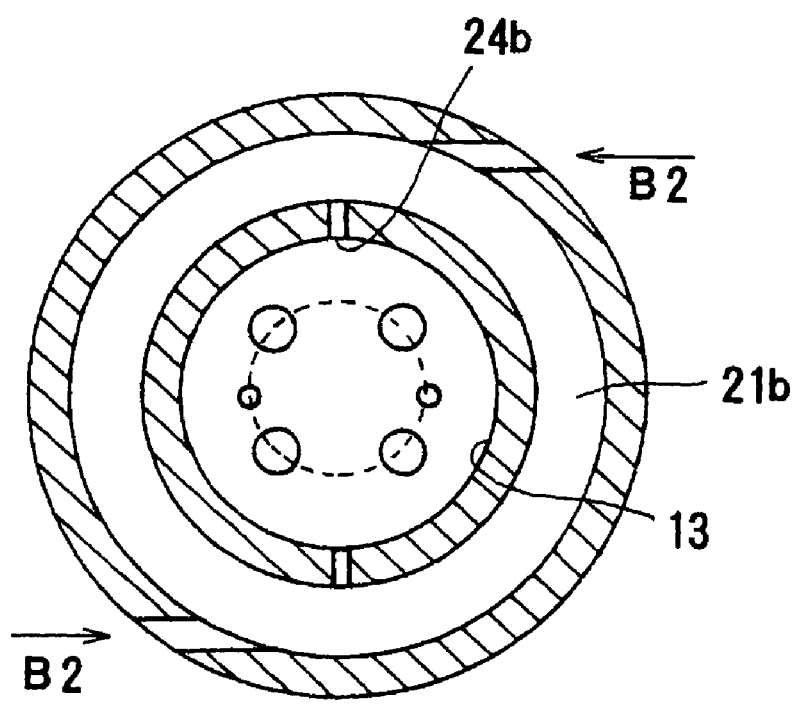
FIG. 15 is a cross-sectional view taken along line VI—VI of FIG. 14.

FIGS. 13, 14, and 15 show another modification of the second embodiment of the present invention. In this modification, the air chamber 22 defined in the cylindrical body 12 extends in the axial direction of the peripheral wall 13 of the cylindrical body 12. The air ejection nozzles 25, which provide communication between the air chamber 22 and the flame stabilizing zone 15, are provided in four at a group in a circumferential surface. Specifically, the air ejection nozzles 25 are provided in three groups including a first group 25a defined in the peripheral wall closely to the plate, a second group 25b substantially at the center in the longitudinal direction of the peripheral wall, and a third group 25c defined in the peripheral wall at a position close to the combustion chamber. A combustion gas outlet 30 is integrally joined to the lower end of the combustion chamber 11. In this modification, the second auxiliary combustible gas flame holes 24b are arranged to eject the secondary auxiliary combustible gas slightly downward.

In the present modification, the air ejected from the air chamber 22 into the flame stabilizing zone 15 is divided into three groups spaced along the axial direction of the peripheral wall 13. This action is the same as with the modification shown in FIGS. 5 and 6.

In the above modifications, the burner may have a single auxiliary combustible gas flame hole 24 or a single first auxiliary combustible gas flame hole 24a, which may be disposed between either pair of waste gas flame holes 23.

Alternatively, the burner may have a single waste gas flame hole 23 and a single auxiliary combustible gas flame hole 24 or a single first auxiliary combustible gas flame hole 24a, which may be positioned on a circular shape pattern substantially around the center of the flame stabilizing zone.

Further alternatively, the burner may have a single waste gas flame hole 23 and two auxiliary combustible gas flame holes 24 or two first auxiliary combustible gas flame holes 24a, which may be positioned on a circular shape pattern substantially around the center of the flame stabilizing zone.

The second auxiliary combustible gas flame holes 24b may be arranged to accelerate the swirling flow substantially tangentially to the inner circumferential surface of the flame stabilizing zone. Alternatively, this design may be combined with the configuration shown in FIGS. 13, 14, and 15 for ejecting the secondary auxiliary combustible gas slightly downstream substantially tangentially to the inner circumferential surface of the flame stabilizing zone.

A second aspect of the present invention will be described below with reference to FIGS. 16 through 24.

Figure 16:
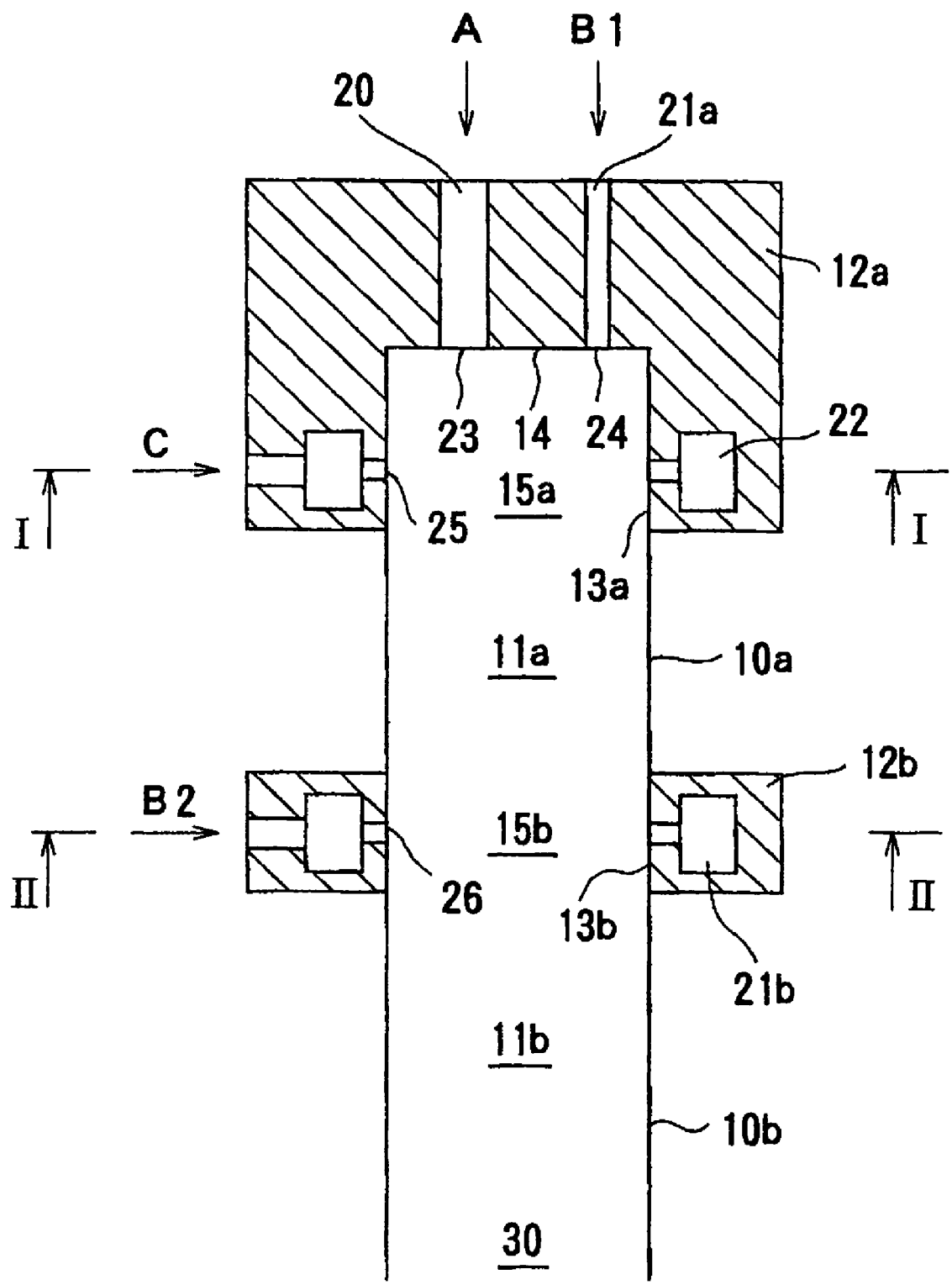
FIG. 16 is a longitudinal cross-sectional view showing a third embodiment of the present invention.
Figure 17:
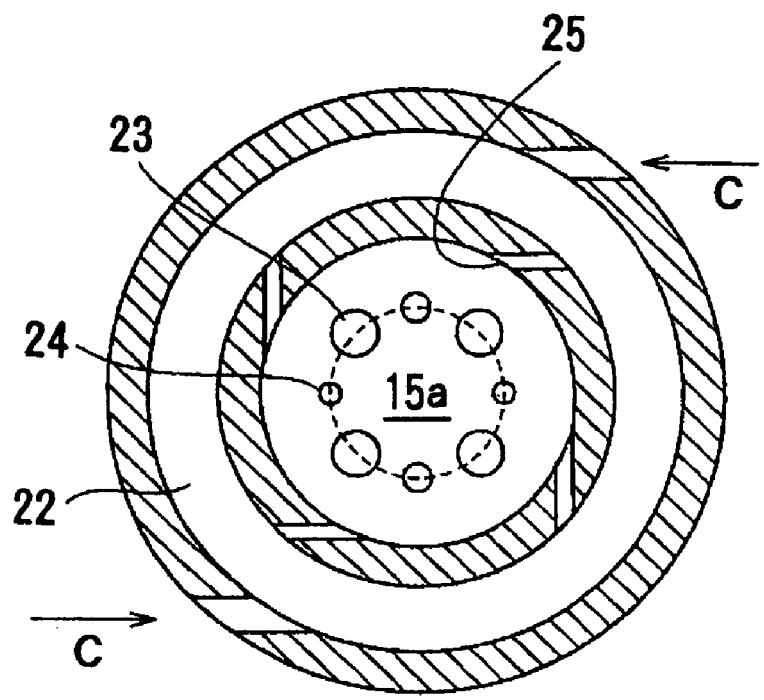
FIG. 17 is a cross-sectional view taken along line I—I of FIG. 16.
Figure 18:
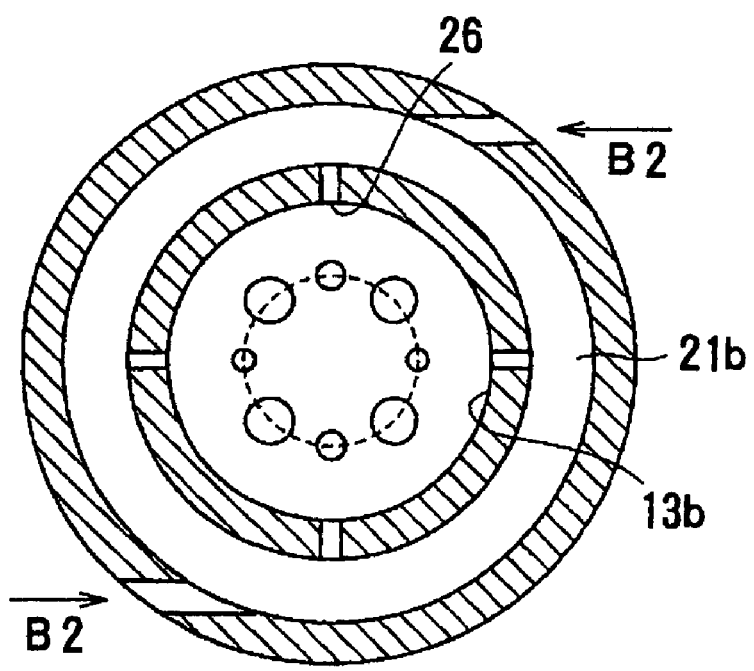
FIG. 18 is a cross-sectional view taken along line II—II of FIG. 16.

FIGS. 16, 17, and 18 show a third embodiment of the present invention. A first combustion chamber 11a surrounded by a first furnace wall 10a is confronted by a first flame stabilizing zone 15a, which is surrounded by a peripheral wall 13a defined by an inner circumferential surface of a first cylindrical body 12a and closed by a plate 14. The first cylindrical body 12a is integrally formed with the plate 14.

In the plate 14, there are defined a plurality of (four as shown) waste gas chambers 20 for holding and guiding a waste gas A to be treated which is mainly composed of nitrogen and contains a deposition gas containing $SiH_4$ and a halogen-base gas emitted from a semiconductor fabrication facility, for example, and a plurality of (four as shown) first auxiliary combustible gas chambers 21a for holding and guiding a primary auxiliary combustible gas B1, which is a fuel gas such as hydrogen, a town gas, LPG, etc. An air chamber 22 for holding and guiding air C is defined in the first cylindrical body 12a, which extends from the plate 14. The peripheral wall 13a of the first cylindrical body 12a has an inside diameter which is substantially the same as the inside diameter of a peripheral wall 10a of the first combustion chamber 11a, and is joined to the peripheral wall 10a. A second flame stabilizing zone 15b surrounded by a second peripheral wall 13b which is defined by an inner circumferential surface of a second cylindrical body 12b is disposed axially downstream of the first combustion chamber 11a.

The second cylindrical body 12b has a second auxiliary combustible gas chamber 21b defined therein for holding and guiding a secondary auxiliary combustible gas B2, which is a fuel gas. The peripheral wall 13b of the second cylindrical body 12b has an inside diameter which is substantially the same as the inside diameter of the peripheral wall 10a of the first combustion chamber 11a.

The peripheral wall of the second cylindrical body 12b extends axially downstream and is joined to a peripheral wall 10b of a second combustion chamber 11b which has an inside diameter that is substantially the same as the inside diameter of the peripheral wall of the second cylindrical body 12b. A combustion gas outlet 30 is integrally joined to the lower end of the combustion chamber 11b.

The plate 14 has, defined in a lower surface thereof, a plurality of (four as shown) waste gas flame holes 23 extending from the waste gas chambers 20 and opening toward the first flame stabilizing zone 15a, the waste gas flame holes 23 being smaller in diameter than the flame stabilizing zone 15a, and a plurality of (four as shown) first auxiliary combustible gas flame holes 24 providing communication between the first auxiliary combustible gas chambers 21a and the flame stabilizing zone 15a, the waste gas flame holes 23 and the first auxiliary combustible gas flame holes 24 being arranged in a doughnut-shaped pattern. The doughnut-shaped pattern means that the first auxiliary combustible gas flame holes 24 are disposed adjacent to the waste gas flame holes 23 in a substantially annular shape substantially around the center of the plate that defines the flame stabilizing zone. In the present embodiment, the waste gas flame holes 23 and the first auxiliary combustible gas flame holes 24 are positioned alternately with each other, and the annular shape is in same position with a free vortex region where a swirling air flow has a high speed, as described later on.

The inner peripheral wall 13 of the first cylindrical body 12a has a plurality of (four as shown) air ejection nozzles 25 positioned away from the plate and close to the first combustion chamber 11a and providing communication between the air chamber 22 and the flame stabilizing zone 15. The peripheral wall 13b of the second auxiliary combustible gas chamber 21b has a plurality of (four as shown) second auxiliary combustible gas flame holes 26 providing communication between the second flame stabilizing zone 15b and the second auxiliary combustible gas chamber 21b. The air ejection nozzles 25 extend substantially tangentially to the circumferential surface of the first flame stabilizing zone 15a for producing and ejecting a swirling flow of air C substantially circumferentially toward the first flame stabilizing zone 15a. The second auxiliary combustible gas flame holes 26 are arranged to eject a secondary auxiliary combustible gas B2 toward the center of the second flame stabilizing zone 15b.

Operation of the present embodiment will be described below.

The air C is guided into and held by the air chamber 22, and ejected substantially circumferentially as a strong swirling flow from the air ejection nozzles 25 defined in the inner circumferential surface of the first cylindrical body 12a into the first flame stabilizing zone 15a. The waste gas A is guided into and held by the waste gas chambers 20, and ejected from the waste gas flame holes 23 defined in the lower surface of the plate 14 into the first flame stabilizing zone 15a. The primary auxiliary combustible gas B1 is guided into and held by the first auxiliary combustible gas chambers 21a, and ejected from the first auxiliary combustible gas flame holes 24 defined in the lower surface of the plate 14 into the first flame stabilizing zone 15a. The waste gas A and the primary auxiliary combustible gas B1 which are ejected, are mixed with the swirling air flow. When ignited by an ignition source, not shown, the mixed gases produce swirling flames, which are primary flames, along the inner circumferential surface of the first cylindrical body 12a. The flow rate of the air C is greater than a theoretical equivalent to the flow rate of the primary auxiliary combustible gas B1, so that the produced primary flames are fuel-lean combustion flames characterized by the lean fuel.

The air ejected substantially circumferentially from the peripheral wall produces a strong swirling flow. The swirling flow has a vortex center swirling together with the swirling flow and a doughnut-shape free vortex region around the vortex center with the flow speed being lower toward the outer edge of the doughnut-shape free vortex. Since the flame holes for the waste gas A and the primary auxiliary combustible gas B1 are defined in the lower surface of the plate 14 in an annular shape on same position with a free vortex region, the waste gas A and the primary auxiliary combustible gas B1 are ejected into the free vortex region and engulfed by the swirling air flow. These gases are sheared due to changes in the speed of the swirling air flow, and sufficiently mixed with the air C. The mixture of the waste gas A, the primary auxiliary combustible gas B1, and the air C produces swirling fuel-lean flames and causes a primary combustion. The flames produced in the first flame stabilizing zone 15a complete the combustion in the first combustion chamber 11a positioned downstream thereof. Although the primary auxiliary combustible gas B1 and the air C are separately blown into the first flame stabilizing zone 15a, since the waste gas is combusted after it is mixed with the primary auxiliary combustible gas and the air, pre-mixed flames are produced.

Pre-mixed flames can be achieved when the waste gas A and the primary auxiliary combustible gas B1 are ejected from positions on the doughnut-shape pattern on the plate into the free vortex region where the swirling air flow has a high speed and is subject to large speed changes, and are mixed with the air C, as is the case with the present invention. The swirling flow serves to hold the flames, allowing the combustion to be maintained without the danger of extinguishing the flames even though the flames are fuel-lean. Generally, pre-mixed fuel-lean flames have a low combustion temperature and cause a combustion where the generated amount of NOx is low. Since pre-mixed flames produced in the first flame stabilizing zone 15a are fuel-lean flames, they have a low combustion temperature and contains a low amount of NOx. The $SiH_4$ gas contained in the waste gas A is destroyed by way of oxidization by the produced fuel-lean flames, producing a powder of $SiO_2$. Since the primary fuel-lean flames start being produced from a position spaced from the plate and the combustion is completed in the first combustion chamber 11a, the $SiH_4$ gas contained in the waste gas starts to be destroyed by way of oxidization from a position spaced from the plate, and converted in its entirety into the powder of $SiO_2$ in the first combustion chamber 11a. If the powder of $SiO_2$ is exposed to a high temperature, it becomes a glassy substance and tends to adhere to the peripheral wall 10a. However, the powder of $SiO_2$ remains as a powder in the present embodiment because the fuel-lean flames have a low temperature.

In addition, the first flame stabilizing zone 15a and the first combustion chamber 11a are of substantially the same diameter, providing no stagnant regions in the flames and combustion exhaust gas flow. Because the speed of the axial downstream flow of the combustion exhaust gas is selected to blow away the powder of $SiO_2$, the produced powder of $SiO_2$ is blown downstream by the flow of the combustion exhaust gas without being attached to the wall surfaces. As $SiH_4$ is destroyed by way of oxidization in a region spaced from the plate 14, the produced powder of $SiO_2$ is prevented from being attached to and deposited on the surfaces surrounding the waste gas flame holes 23 and the first auxiliary combustible gas flame holes 24.

The primary combustion exhaust gas discharged after the combustion based on the primary flames in the first combustion chamber 11a is completed enters the second flame stabilizing zone 15b. The secondary auxiliary combustible gas B2 is ejected from the second auxiliary combustible gas flame holes 26 toward the center of the second flame stabilizing zone 15b. The ejected secondary auxiliary combustible gas B2 is mixed with the primary combustion exhaust gas, causing a secondary combustion with oxygen remaining in the primary combustion exhaust gas. Flames produced in the second flame stabilizing zone 15b complete the combustion within the second combustion chamber 11b positioned downstream of the second flame stabilizing zone 15b. Since the concentration of the oxygen remaining in the primary combustion exhaust gas is much lower than the concentration of oxygen contained in the air, a low-oxygen-concentration combustion takes place in the secondary combustion. In the low-oxygen-concentration combustion, NOx is produced in a small quantity, causing a low-NOx combustion. The low-NOx combustion is effective to further increase the temperature of the primary combustion exhaust gas. A high temperature is required to thermally destroy a halogen-base gas. In the present embodiment, the halogen-base gas can be thermally destroyed by produced higher-temperature flames in the secondary combustion.

As described above, all the waste gas A is sufficiently mixed with the primary auxiliary combustible gas B1 and the air C by the swirling air flow in the first flame stabilizing zone 15a, producing primary fuel-lean flames, and the fuel-lean swirling flames extending into first combustion chamber decompose the deposition gas of $SiH_4$ while suppressing the generation of NOx, and simultaneously blow away the produced powder of $SiO_2$. In the second combustion chamber, a high-temperature combustion is caused with low oxygen, thermally destructing the halogen-base gas in a low-NOx combustion.

Inasmuch as the primary and secondary auxiliary combustible gases B1, B2 which are the fuel gas and the air C are mixed with each other in the first and second flame stabilizing zones, the primary and secondary auxiliary combustible gases are not ignited in the first and second auxiliary combustible gas chambers 21a, 21b, making the burner highly safe, even if the first and second cylindrical bodies are heated by the flames. In the present embodiment, when the air C is supplied circumferentially to the air chamber 22, the air C swirls in the air chamber 22, uniformly cooling the air chamber 22 to prevent the cylindrical body from being heated. Similarly, when the secondary auxiliary combustible gas B2 is supplied circumferentially to the second auxiliary combustible gas chamber 21b, the secondary auxiliary combustible gas B2 swirls in the second auxiliary combustible gas chamber 21b, uniformly cooling the second auxiliary combustible gas chamber 21b.

In the third embodiment, the first cylindrical body 12a and the second cylindrical body 12b, i.e., the first combustion chamber 11a and the second combustion chamber 11b, have substantially the same diameter as each other. With this arrangement, the diameter of the swirling flow remains substantially the same to the outlet, eliminating any stagnant flow regions from the flame stabilizing zones to the outlet thereby to prevent the powder of $SiO_2$, which is generated when the deposition gas of $SiH_4$ is decomposed from being attached to the wall surfaces.

In the present embodiment, the burner has four air ejection nozzles 25 defined in the circumferential surface. However, the burner may have more than or less than four air ejection nozzles 25. Similarly, while the burner is shown as having four second auxiliary combustible gas flame holes 26 defined in the circumferential surface, the burner may have more than or less than four second auxiliary combustible gas flame holes 26.

Figure 19:
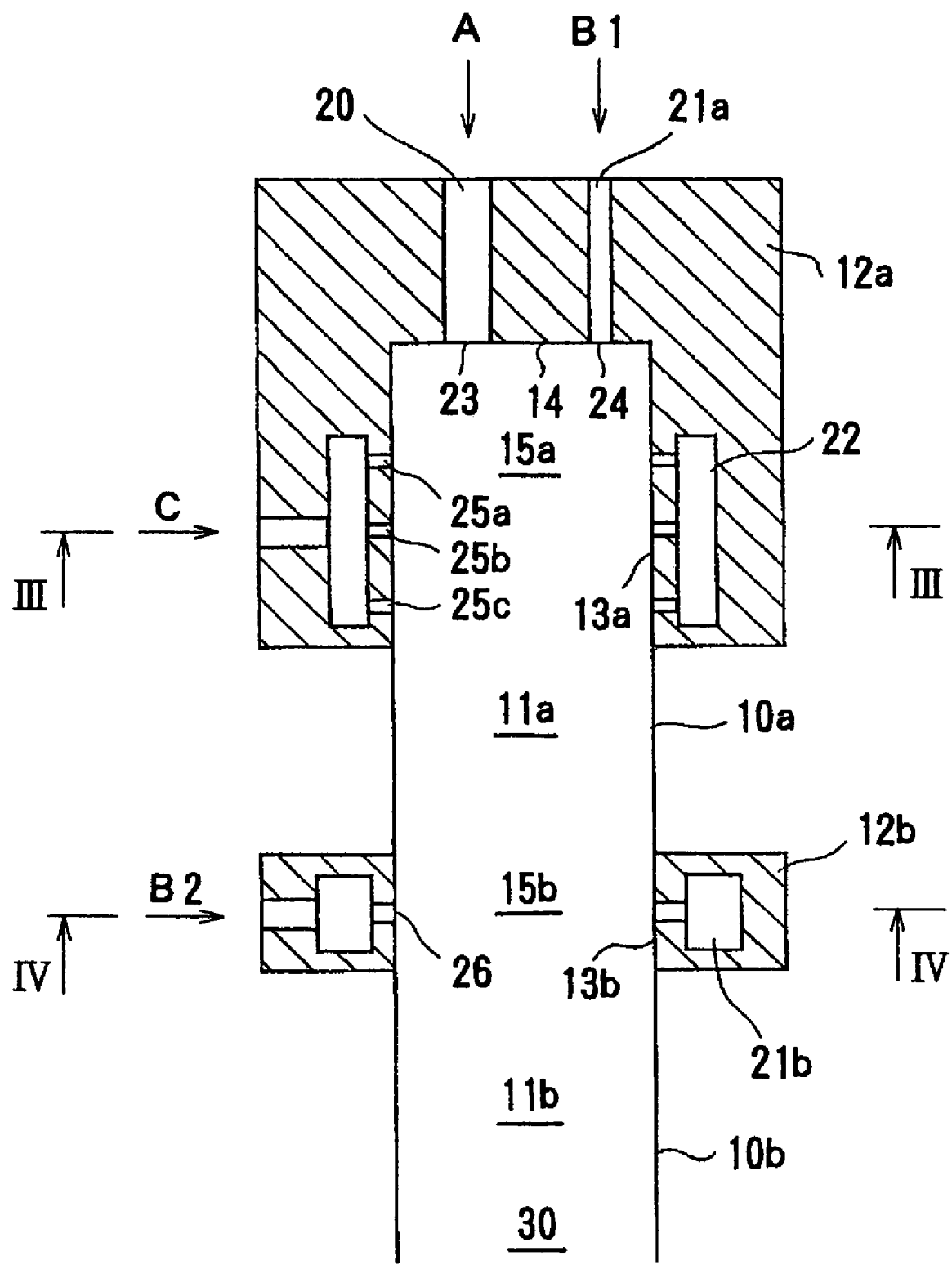
FIG. 19 is a longitudinal cross-sectional view showing a fourth embodiment of the present invention.

FIGS. 19, 20, and 21 show a fourth embodiment of the present invention. The air chamber 22 defined in the first cylindrical body 12*a* extends in the axial direction of the peripheral wall 13*a* of the first cylindrical body 12*a*. The air ejection nozzles 25 which provide communication between the air chamber 22 and the first flame stabilizing zone 15*a* are provided in four at a group in a circumferential surface. Specifically, the air ejection nozzles 25 are provided in three groups including a first group 25*a* defined in the peripheral wall closely to the plate, a second group 25*b* defined in the peripheral wall, and a third group 25*c* defined in the peripheral wall at a position facing the combustion chamber. As with the third embodiment, the first group of air ejection nozzles 25 is spaced from the plate 14 of the first cylindrical body 12*a*.

Operation of the present embodiment will be described below.

The air ejected from the air chamber 22 into the first flame stabilizing zone 15*a* is divided into three groups spaced along the axial direction of the peripheral wall 13*a*. Usually, the total amount of supplied air is several or several tens times the amount of auxiliary combustible gas. When the air is divided into three stages along the axial direction and supplied to the first flame stabilizing zone 15*a*, the amount of air ejected from each of the groups is smaller than when the air is not divided. The amount of air ejected from the air ejection nozzles 25*a* in the first group is not large enough to combust all the fuel gas, producing fuel-rich flames in the flame stabilizing zone. When air is supplied from the second and third groups of air ejection nozzles 25*b*, 25*c*, the sufficient amount of air is supplied to the fuel gas, producing fuel-lean flames. When the air is thus supplied stepwise, the combustion occurs slowly to prevent local high-temperature regions from being produced and to lower and uniformize the flame temperature in a wide range, making the produced primary fuel-lean swirling flames elongate downstream. As a result, a low-NOx combustion is achieved, and $SiH_4$ is destroyed by way of oxidization slowly in a wide region. At the same time, since a powder of $SiO_2$ is generated slowly, the removal of the powder of $SiO_2$ from the wall surfaces with the flame and the combustion gas flow is further promoted.

In the present embodiment, the air ejection nozzles 25 are divided in three groups along the axial direction of the flame stabilizing zone. However, the air ejection nozzles 25 may be divided in two groups or four or more groups.

Not all the air ejection nozzles in the groups may eject the air to produce a swirling flow toward the flame stabilizing zone. The air ejection nozzles in the third group, for example, may eject air simply downstream, rather than tangentially to the circumferential surface, or may eject air toward the center of the flame stabilizing zone to cause turbulences with the waste gas and to be mixed with the waste gas.

In the present embodiment, the burner has two first auxiliary combustible gas chambers 21*a* and two auxiliary combustible gas flame holes 24, with the auxiliary combustible gas flame holes 24 being disposed between respective pairs of waste gas flame holes 23. With this arrangement, the primary auxiliary combustible gas B1 is ejected adjacent to the waste gas A and the mixing of the primary auxiliary combustible gas B1 with the waste gas A is promoted.

Figure 22:
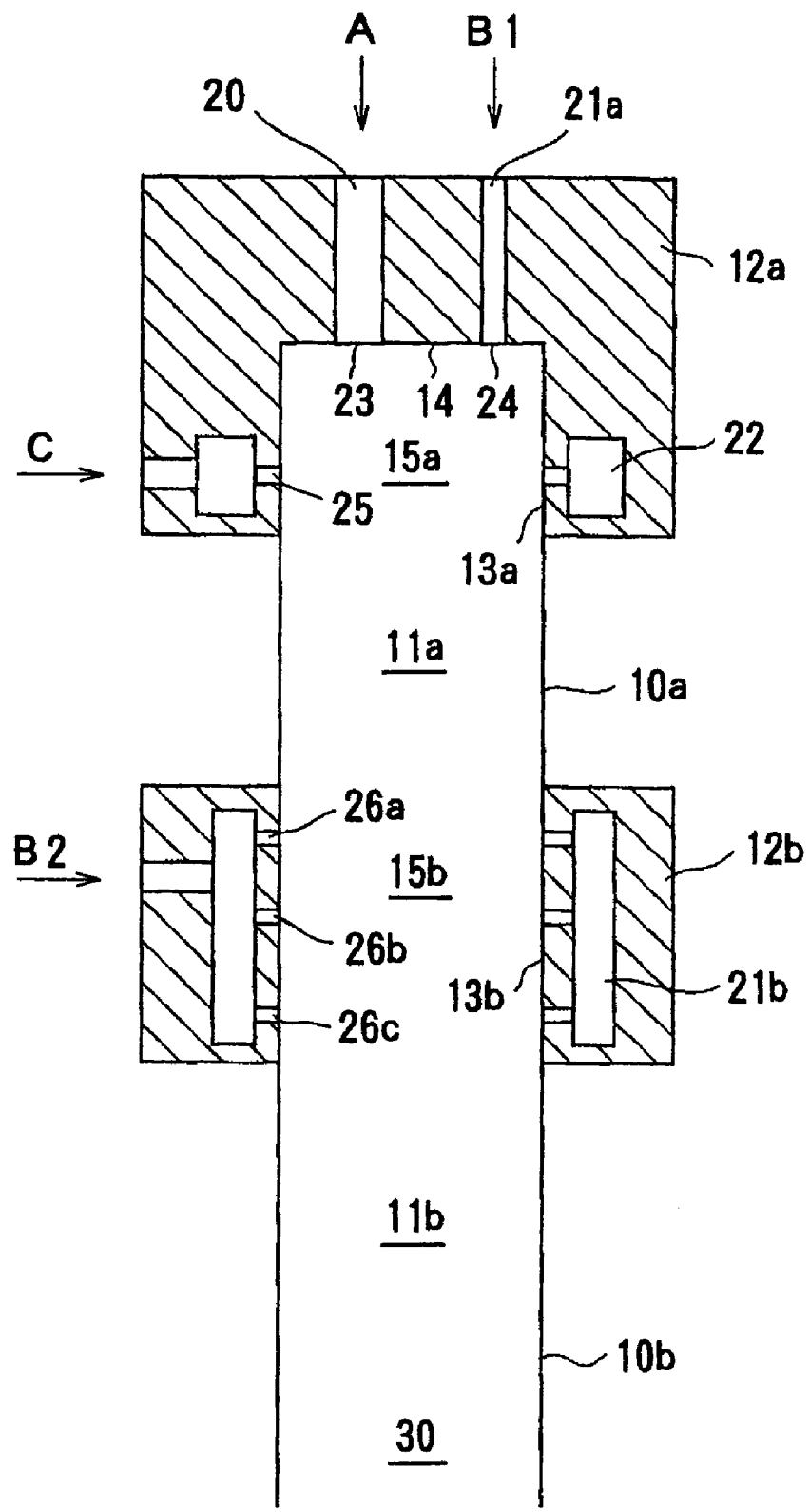
FIG. 22 is a longitudinal cross-sectional view showing a fifth embodiment of the present invention.

FIG. 22 shows a fifth embodiment of the present invention. The second auxiliary combustible gas chamber 21*b* extends in the axial direction of the second cylindrical body 21*b*. The second auxiliary combustible gas flame holes 26 providing communication between the second auxiliary combustible gas chamber 21*b* and the second flame stabilizing zone 15*b* are provided in four at a group in a circumferential surface. Specifically, the second auxiliary combustible gas flame holes 26 are provided in four groups including a first group 26*a* defined in the peripheral wall in an upstream position, a second group 26*b* substantially at the center in the longitudinal direction of the peripheral wall, and a third group 26*c* defined in the peripheral wall at a position close to the combustion chamber.

Operation of the present embodiment will be described below.

The secondary auxiliary combustible gas B2 ejected from the second auxiliary combustible gas chamber 21*b* toward the second flame stabilizing zone 15*b* is divided into three groups spaced along the axial direction of the peripheral wall 13*b*. When the secondary auxiliary combustible gas B2 is divided into three stages along the axial direction and supplied to the second flame stabilizing zone 15*b*, the amount of secondary auxiliary combustible gas B2 ejected from each of the flame holes is smaller than when the secondary auxiliary combustible gas B2 is not divided, producing small flames in front of the flame holes. The secondary auxiliary combustible gas B2 is supplied stepwise from the second auxiliary combustible gas flame holes 26*b*, 26*c* in the second and third groups, producing low-oxygen flames that are smaller stepwise downstream. Therefore, a high-temperature flame zone is produced in a wide range over the second flame stabilizing zone 15*b* and the second combustion chamber 11*b*. In this manner, a high-temperature zone required to destroy the halogen-base gas is developed in a wide region, increasing a high-temperature remaining time required to destroy the halogen-base gas for thereby destructing the halogen-base gas with a high efficiency.

In the present embodiment, the second auxiliary combustible gas flame holes 26 are divided in three groups along the axial direction of the flame stabilizing zone. However, the second auxiliary combustible gas flame holes 26 may be provided in two groups or four or more groups.

The second auxiliary combustible gas flame holes 26, 26*a*, 26*b*, 26*c* may not eject the secondary auxiliary combustible gas toward the center of the flame stabilizing zone, but may eject the secondary auxiliary combustible gas slightly downstream. Alternatively, the second auxiliary combustible gas flame holes 26, 26*a*, 26*b*, 26*c* may eject the secondary auxiliary combustible gas to accelerate the swirling flow substantially tangentially to the flame stabilizing zone, as with the air ejection holes 25. Further alternatively, these optional arrangements may be combined with each other to eject the secondary auxiliary combustible gas.

In the above embodiments, the burner may have a single first auxiliary combustible gas flame hole 24, which may be disposed between either pair of waste gas flame holes 23. The burner may have two or three waste gas flame holes 23 rather than four waste gas flame holes 23. The burner may have a single waste gas flame hole 23 and a single first auxiliary combustible gas flame hole 24, which may be positioned on a circular pattern substantially around the center of the first flame stabilizing zone. Further alternatively, the burner may have a single waste gas flame hole 23 and plural first auxiliary combustible gas flame holes 24, which may be positioned on a circular shape pattern substantially around the center of the first flame stabilizing zone.

Figure 23:
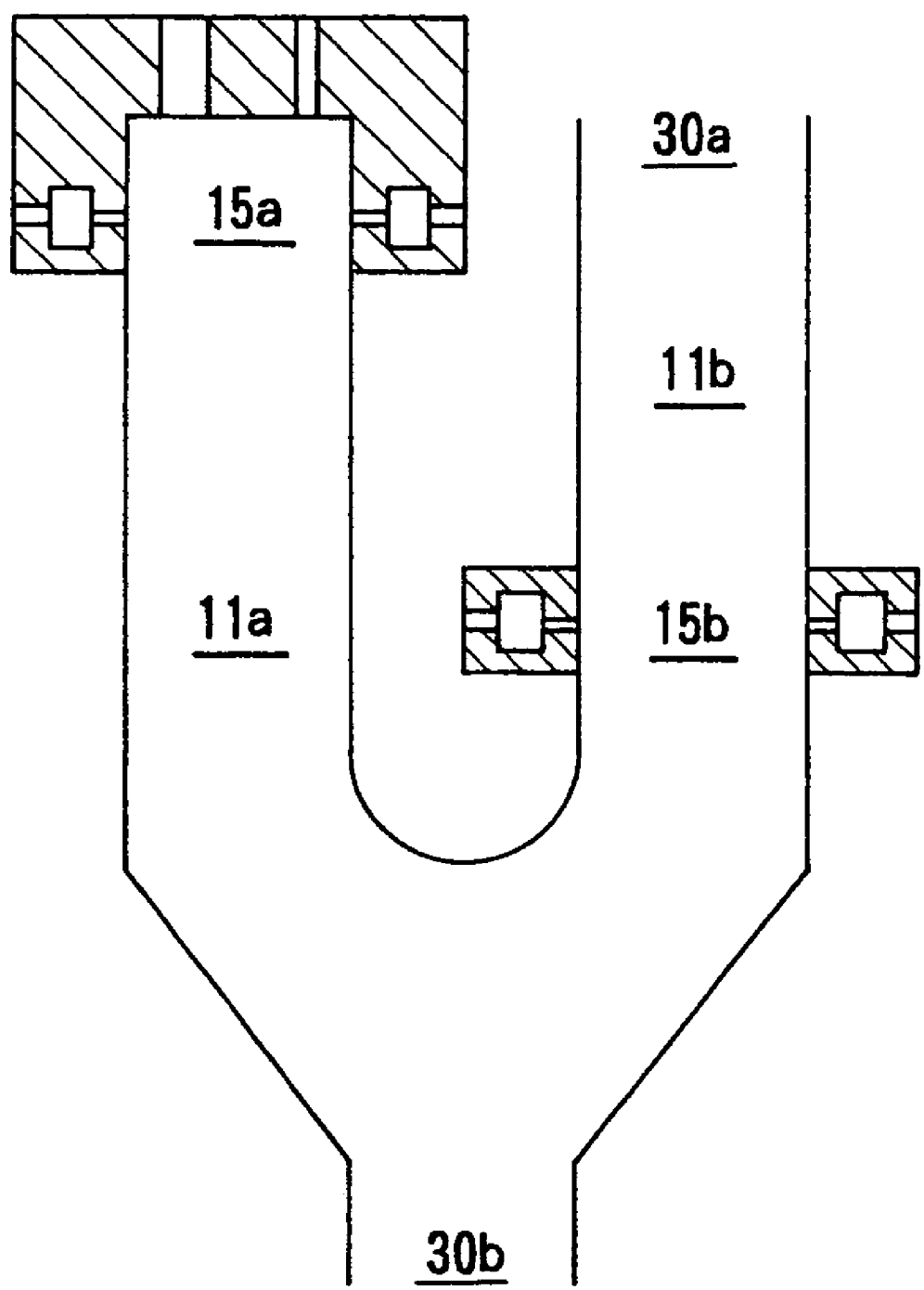
FIG. 23 is a longitudinal cross-sectional view showing a sixth embodiment of the present invention.

FIG. 23 shows a sixth embodiment of the present invention. The first flame stabilizing zone 15*a* and the first combustion chamber 11*a* are positioned successively downstream, the first combustion chamber 11a having a lower portion bent into a U shape with an extension from which the second flame stabilizing zone 15b, the second combustion chamber 11b, and a combustion exhaust gas outlet 30a are successively arranged upwardly. A draw off pipe 30b for carrying away a powder of $SiO_2$ is connected to the bottom of the U-shaped first combustion chamber. With this construction, the powder of $SiO_2$ which is produced in the first combustion chamber is separated from the exhaust gas in the U-shaped first combustion chamber, and drawn out of the combustion chamber through the draw off pipe 30b without passage through the second flame stabilizing zone 15b and the second combustion chamber 11b. Consequently, the powder of $SiO_2$ is not deposited in the combustion chamber, but can be treated with increased efficiency.

Figure 24:
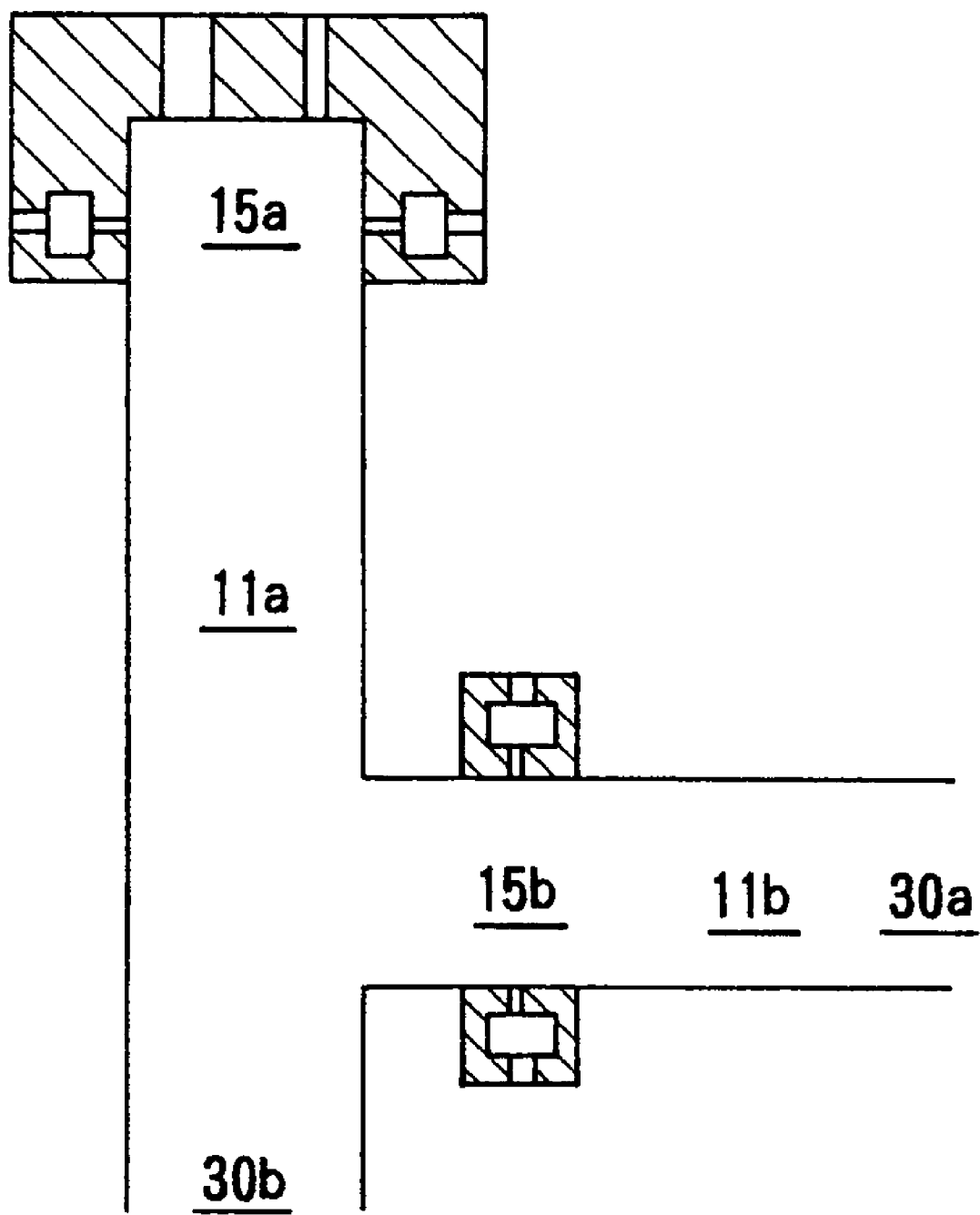
FIG. 24 is a longitudinal cross-sectional view showing a seventh embodiment of the present invention.

FIG. 24 shows a seventh embodiment of the present invention. The first combustion chamber 11a has a lower portion bent into an L shape with an extension from which the second flame stabilizing zone 15b, the second combustion chamber 11b, and the combustion exhaust gas outlet 30a are successively arranged horizontally. The draw pipe 30b for carrying away a powder of $SiO_2$ is connected to the bottom of the L-shaped first combustion chamber 11a. With this construction, the powder of $SiO_2$ which is produced in the first combustion chamber is separated from the exhaust gas in the L-shaped first combustion chamber, providing the same advantages as with the sixth embodiment.

A third aspect of the present invention will be described below with reference to FIGS. 25 through 27.

Figure 25:
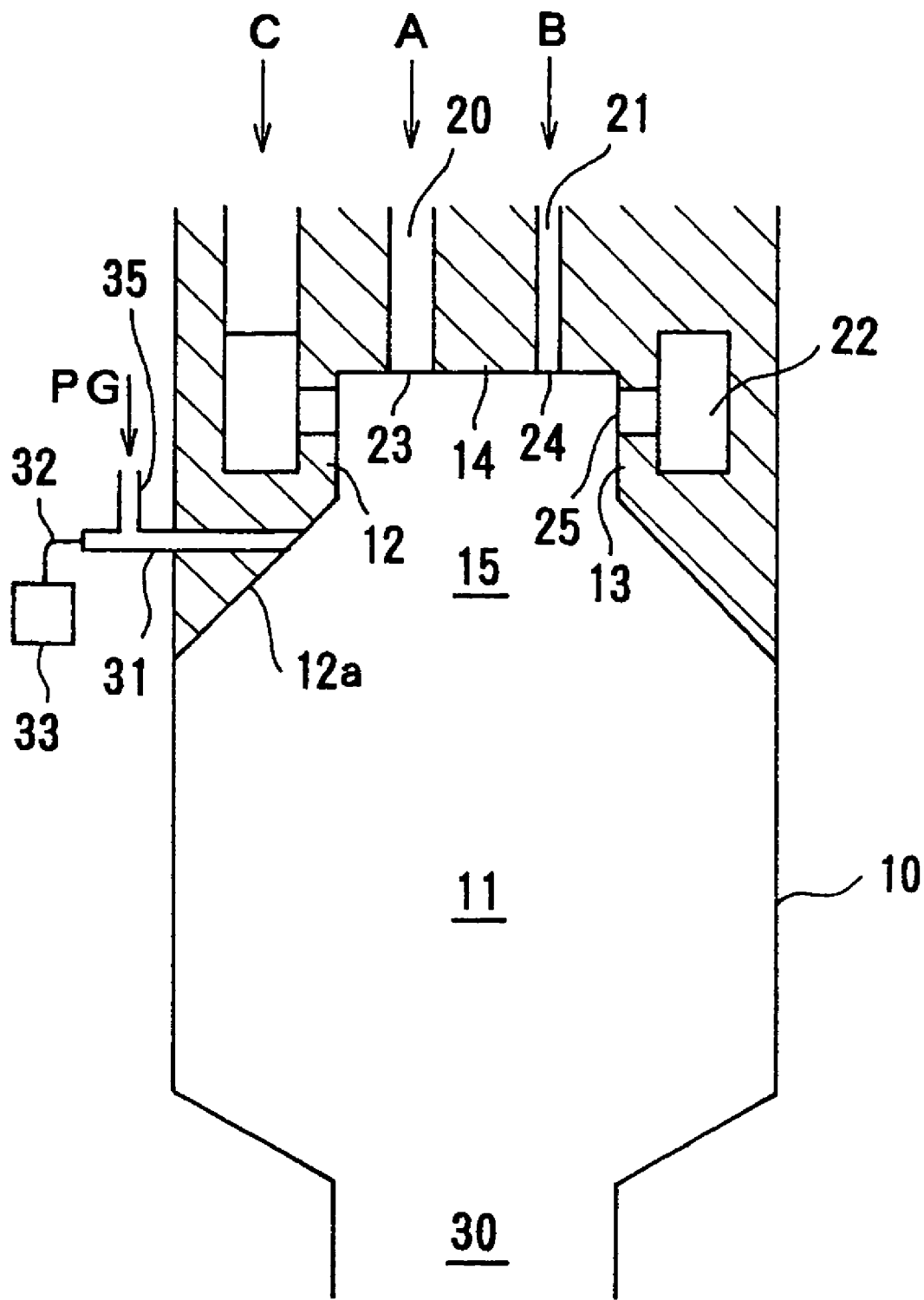
FIG. 25 is a longitudinal cross-sectional view showing an eighth embodiment of the present invention.

FIG. 25 shows an eighth embodiment of the present invention. According to the eighth embodiment, a pipe or hole for directly viewing combustion flames is provided in the flame stabilizing zone or the combustion chamber upstream of the combustion flames, and a UV sensor for detecting the combustion flames through the pipe or hole is provided. In the illustrated embodiment, the UV sensor is combined with the combustion-type waste gas treatment system shown in FIG. 1. However, the UV sensor may be combined with the combustion-type waste gas treatment system according to each of the above embodiments.

The combustion-type waste gas treatment system has a flame direct-vision pipe 31 for directly viewing combustion flames produced when the waste gas A, the auxiliary combustible gas B, and the air C are mixed and combusted, thereby to confirm whether combustion flames are present or not. As shown in FIG. 25, the flame direct-vision pipe 31 is positioned upstream of combustion flames, and an UV sensor 33 for detecting combustion flames is connected through an optical fiber 32 to an end of the flame direct-vision pipe 31 remote from the combustion chamber. The UV sensor 33 may alternatively be connected directly to the flame direct-vision pipe 31.

Since the flame direct-vision pipe 31 is positioned upstream of combustion flames, rather than downstream of combustion flames, by-products such as dust generated when the exhaust gas is treated are prevented from clogging the light entrance port of the flame direct-vision pipe 31, preventing the UV sensor 33 from failing to detect combustion flames. Since combustion flames are directly viewed through the flame direct-vision pipe 31, even when by-products having a UV absorbing capability are deposited in the reaction region (mainly in the combustion chamber 11), they do not obstruct the introduction of light, but the UV sensor 33 can detect combustion flames. Because the flame direct-vision pipe 31 is positioned in a wall upstream of combustion flames where the temperature is relatively low, the light entrance port is not melted or corroded and closed at high temperatures. A quartz glass panel for passing ultraviolet radiation therethrough is disposed in the junction between the flame direct-vision pipe 31 and the UV sensor 33, and a seal member is interposed between the quartz glass panel and the junction, thus blocking the UV sensor 33 from the atmosphere in the combustion chamber 11. A purge gas inlet pipe 35 is connected to the flame direct-vision pipe 31 for introducing a purge gas (PG: e.g., air) into the flame direct-vision pipe 31.

Inasmuch as the quartz glass panel is disposed in the junction between the flame direct-vision pipe 31 and the UV sensor 33, and the purge gas (PG) is introduced into the flame direct-vision pipe 31, the light entrance port of the flame direct-vision pipe 31 is prevented from being clogged with by-products. The quartz glass panel is thick enough to withstand the internal pressure of the combustion chamber 11. The seal member comprises a heat-resistant gasket. Light emitted from combustion flames in the flame direct-vision pipe 31 is transmitted to the UV sensor 33 by the optical fiber 32.

Since the light emitted from combustion flames in the flame direct-vision pipe 31 is transmitted to the UV sensor 33 by the optical fiber 32, the UV sensor 33 may be installed in a location free of space availability problems and heat resistance problems even though the UV sensor 33 cannot be placed at the end of the flame direct-vision pipe 31 remote from the combustion chamber due to such space availability problems and heat resistance problems. For details of the layout of the flame direct-vision pipe and the UV sensor, reference should be made to Japanese patent application No. 2000-294632.

Figure 26:
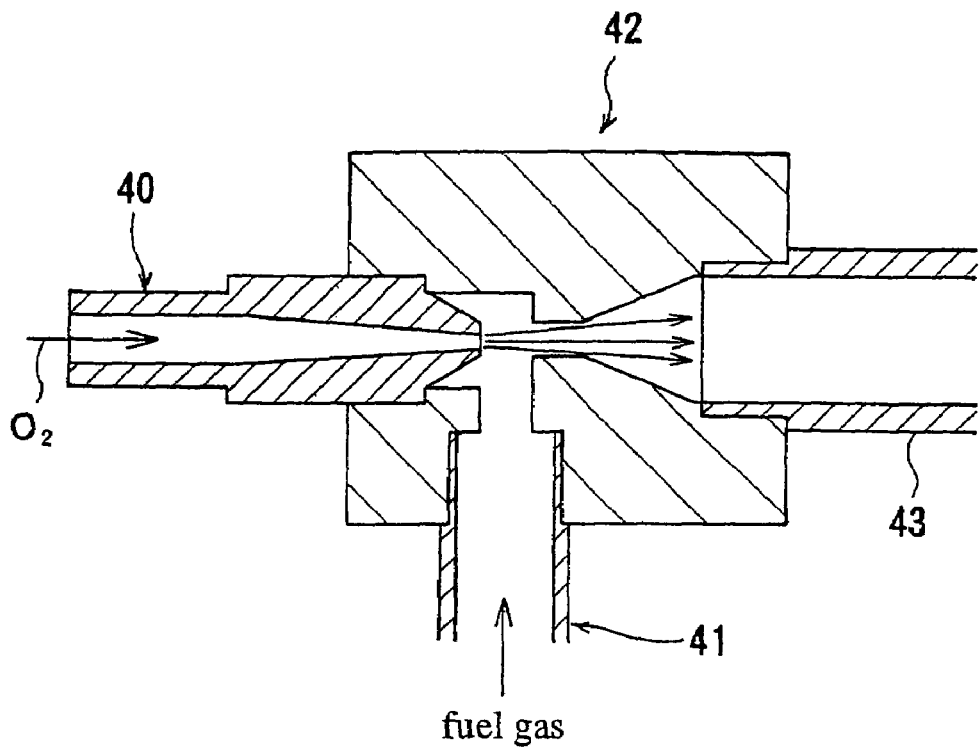
FIG. 26 is a longitudinal cross-sectional view showing a ninth embodiment of the present invention.

FIG. 26 shows a ninth embodiment of the present invention. According to the ninth embodiment, a mixer outside of an auxiliary combustible agent supply unit is supplied with an oxygen-containing gas from an oxygen-containing gas supply line and a fuel gas from a fuel gas supply line, and mixes and supplies the gases to a combustion chamber, in which the supplied gases are combusted to produce combustion flames.

In the combustion-type waste gas treatment system, oxygen supplied from an oxygen gas supply line 40 and a fuel gas (e.g., propane gas) supplied from a fuel gas supply line 41 are mixed with each other by a mixer 42, and the mixed gas is supplied from the mixer 42 through a mixed gas pipe 43 to the auxiliary combustible gas chambers 21 of the waste gas treatment system. The mixed gas is then ejected from the auxiliary combustible gas chambers 21 through the auxiliary combustible gas ejection holes 24 into the flame stabilizing zone 15.

As described above, the mixer is positioned outside of the combustion chamber, and is supplied with the oxygen-containing gas and the fuel gas, and mixes and supplies the gases to the combustion chamber. It is easy to adjust the mixing ratio of the oxygen-containing gas and the fuel gas in the mixer, allowing the waste gas to be combusted efficiently, preventing the mixed gas from being ignited abnormally and suffering backfiring when it is ignited and extinguished. For details of the mixer, reference should be made to Japanese patent application No. 2000-302410.

Figure 27:
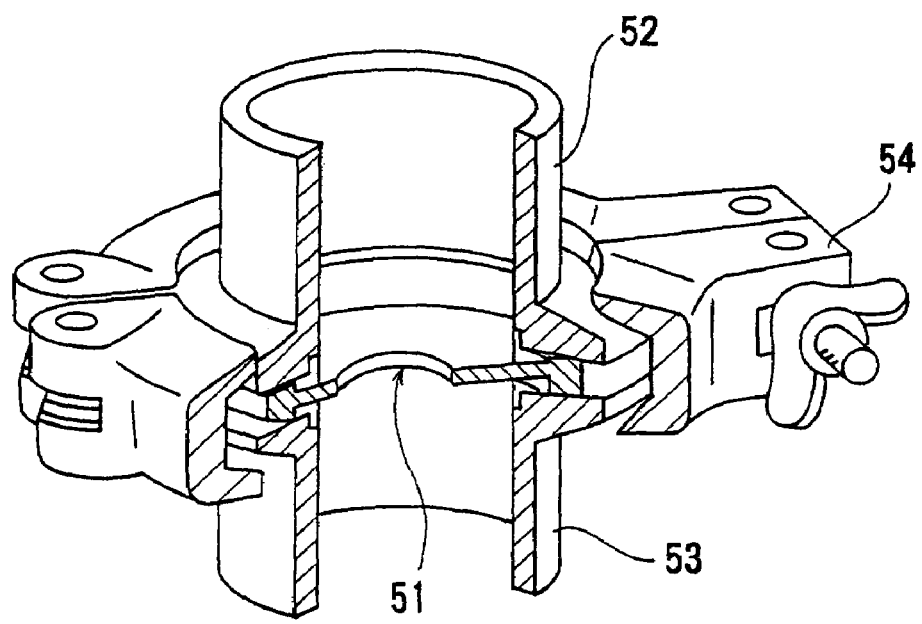
FIG. 27 is a longitudinal cross-sectional view showing a tenth embodiment of the present invention.
Figure 28:
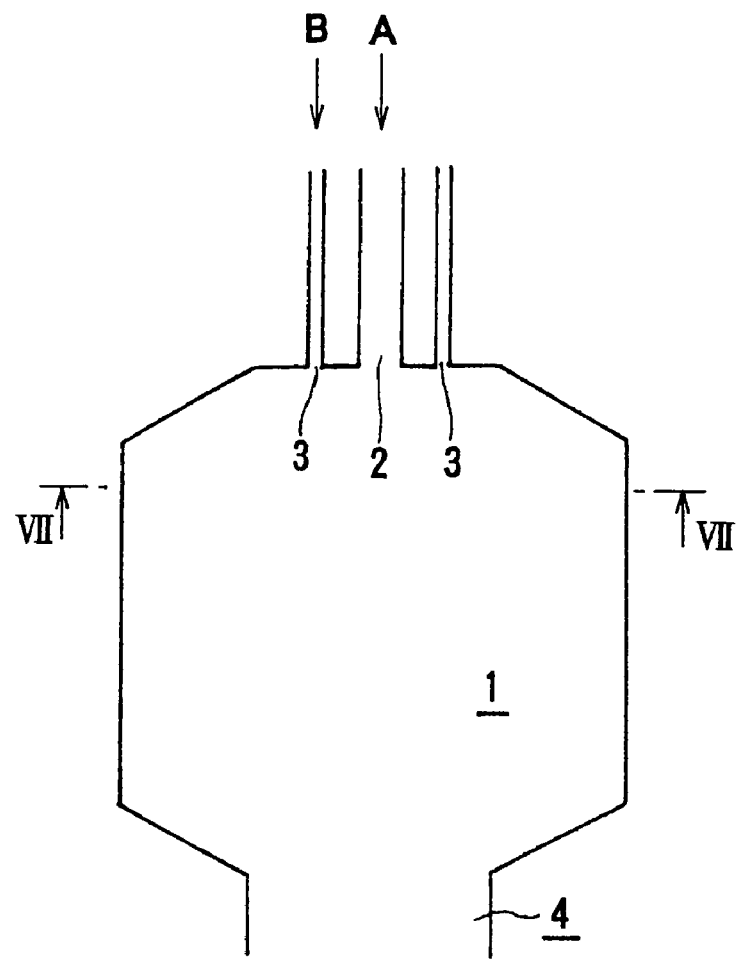
FIG. 28 is a longitudinal cross-sectional view showing a conventional example.
Figure 29:
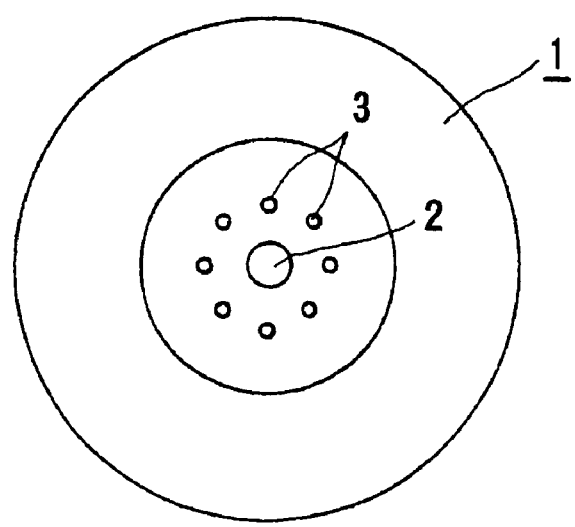
FIG. 29 is a cross-sectional view taken along line VII—VII of FIG. 28.

FIG. 27 shows a tenth embodiment of the present invention. According to the tenth embodiment, the waste gas chamber houses therein a flow speed accelerating means for increasing the flow speed of a combustible waste gas flowing through the waste gas chamber to a level equal to or higher than the combustion velocity of the combustible waste gas.

The flow speed accelerating means has a slender pipe having a small pipe diameter or an orifice 51 disposed in the waste gas chamber, and the inside diameter of the slender pipe or the orifice is selected such that the flow speed of the combustible waste gas passing through the slender pipe or the orifice is equal to or higher than the combustion velocity of the combustible waste gas. The flow speed accelerating means is disposed in a coupling mechanism, which couples a flange 52 on the inlet of the waste gas chamber and a flange 53 on the end of a waste gas supply pipe, which supplies the waste gas to the inlet. The coupling mechanism comprises a clamp member 54, which tightens the outer circumferential edges of the flanges with a plate member having the orifice defined centrally therein and interposed between the flanges. The inside diameter of the orifice is preferably selected such that the flow speed of the combustible waste gas passing through the orifice is equal to or higher than the combustion velocity of the combustible waste gas.

The slender pipe 51 is disposed at the tip end of the waste gas chamber to increase the flow speed of the waste gas A for the purpose of preventing backfire into the waste gas chambers 20. The inside diameter d of the slender pipe 51 is selected such that the flow speed of the waste gas A flowing through the slender pipe 51 is equal to or higher than the combustion velocity of the waste gas A. Specifically, on the assumption that a hydrogen ($H_2$) gas whose combustion velocity is highest under the same conditions flows in, the inside diameter d of the slender pipe 51 is selected such that the flow speed is higher than the combustion velocity, ranging from 2.5 to 2.8 m/s, of the hydrogen gas in the air. For details of the flow speed accelerating means, reference should be made to Japanese patent application No. 2000-302410.

In the above embodiments, the burner is preferably made of a material such as ceramics or a heat-resistant metal material. The auxiliary combustible agent is not limited to a gas fuel such as hydrogen, town gas, or LPG, but may be a gas fuel or a liquid fuel containing oxygen at a concentration lower than the lower explosion concentration limit.

The flame stabilizing zone may not necessarily be of a cylindrical shape, but may be of a polygonal shape such as a rectangular shape. The air ejected from the air ejection nozzles may be high-oxygen-concentration air having an oxygen concentration higher than 21%.

As described above, the first aspect of the present invention offers the following advantages: Since the waste gas, the auxiliary combustible agent, and the air are sufficiently mixed with each other and then combusted, producing elongate flames, in the combustion chamber, the waste gas can be combusted and destroyed with a high efficiency. Pre-mixed flames are produced to achieve a low-NOx combustion. If the air ejection nozzles are divided in a plurality of groups along the axial direction of the flame stabilizing zone, then combustion flames are further elongated for achieving a lower-NOx combustion and increasing the efficiency with which to destroy the halogen-base waste gas.

The second aspect of the present invention offers the following advantages: The air, the auxiliary combustible gas, and the waste gas which is to be treated are sufficiently mixed with each other and combusted to produce primary pre-mixed fuel-lean flames. Then, the auxiliary combustible gas is ejected from the second flame stabilizing zone to produce secondary high-temperature, low-oxygen flames. Thus, while a low-NOx combustion is being achieved, the deposition gas containing $SiH_4$ and the halogen-base gas can simultaneously be destroyed with a high efficiency.

If the air ejection nozzles are divided in a plurality of groups along the axial direction of the flame stabilizing zone, then the deposition gas containing $SiH_4$ can be destroyed slowly in a wide range. Since a powder of $SiO_2$ is also produced slowly, the removal of the powder of $SiO_2$ with the flow of the combustion gas is further increased.

If the auxiliary combustible gas flame holes in the second flame stabilizing zone are divided in a plurality of groups along the axial direction of the flame stabilizing zone, then a high-temperature region required to decompose the halogen-base gas can be developed in a wide region. Thus, the halogen-base gas can be destroyed with a high efficiency.

The third aspect of the present invention offers the following advantages: The pipe (hole) for directly viewing combustion flames is provided upstream of the combustion flames, and the UV sensor is connected to the pipe (hole) for monitoring the combustion flames stably at all times. The mixer for mixing the oxygen-containing gas and the fuel gas with each other is disposed outside of the combustion chamber. The mixer allows the mixing ratio of the fuel gas to be adjusted with ease, making it possible to combust the fuel gas efficiently.

The flow speed accelerating means for increasing the flow speed of the waste gas to a level equal to or higher than the combustion velocity of the waste gas is effective to prevent backfire from occurring.

The burner for treating the waste gas according to the present invention mixes the auxiliary combustible gas and the air with each other in the flame stabilizing zone. Therefore, the auxiliary combustible gas is not ignited in the auxiliary combustible gas chamber even if the cylindrical body is heated by the flames. Therefore, the burner is highly safe in operation. As the air ejected from the air ejection holes produces a swirling flow in the flame stabilizing zone, it cools the surface of the peripheral wall of the cylindrical body to increase the heat-resistant service life thereof.

INDUSTRIAL APPLICABILITY

The present invention is useful in combusting and treating harmful waste gases such as a deposition gas containing $SiH_4$ and a halogen-base gas ($CHF_3$, $C_2F_6$, $CF_4$, etc.), which are emitted from semiconductor manufacturing system.

The invention claimed is:

1. A burner for treating a waste gas, comprising:
   a flame stabilizing zone opened toward a combustion chamber, surrounded by a peripheral wall, and closed by a plate remotely from said combustion chamber;
   a waste gas flame hole disposed on said plate for ejecting the waste gas toward said flame stabilizing zone;
   at least one auxiliary combustible gas flame hole disposed on said plate for ejecting the auxiliary combustible gas, and
   at least one air ejection nozzle disposed on the peripheral wall of said flame stabilizing zone for ejecting air substantially circumferentially to produce a swirling flow;
   wherein said waste gas, an auxiliary combustible gas, and air are introduced into and mixed with each other in said flame stabilizing zone, and the mixed gases are ejected toward said combustion chamber perpendicularly to said plate; and
   wherein said waste gas flame hole and auxiliary combustible gas flame hole are arranged in a substantially circumferential pattern of an annular shape substantially around the center of said flame stabilizing zone.

2. A burner according to claim 1, wherein said auxiliary combustible gas flame hole is disposed adjacent to said waste gas flame hole in said annular shape.

3. A burner according to claim 1, wherein said annular shape is in same position with a free vortex region of said swirling flow.

4. A burner according to claim 1, wherein said waste gas flame hole has a diameter smaller than the inside diameter of said flame stabilizing zone.

5. A burner according to claim 1, wherein a second auxiliary combustible gas flame hole for ejecting the auxiliary combustible gas is defined in the peripheral wall of said flame stabilizing zone downstream of said air ejection nozzle in an axial direction of said flame stabilizing zone.

6. A burner according to claim 1, wherein said at least one air ejection nozzle comprises a plurality of air ejection nozzles in a plurality of groups divided along the axial direction of said flame stabilizing zone.

7. A burner according to claim 1, wherein said flame stabilizing zone is of a cylindrical shape.

8. A burner according to claim 1, wherein said flame stabilizing zone and said combustion chamber are of a cylindrical shape and have substantially same diameter.

9. A burner according to claim 1, wherein a second flame stabilizing zone is disposed downstream in the axial direction of said flame stabilizing zone, and has, defined in a peripheral wall thereof, at least one second auxiliary combustible gas flame hole for ejecting a second auxiliary combustible gas, and a combustion chamber is disposed downstream of said second auxiliary combustible gas flame hole in an axial direction of said second flame stabilizing zone.

10. A burner according to claim 9, wherein said at least one air ejection nozzle comprises a plurality of air ejection nozzles in a plurality of groups divided along axial direction of said first flame stabilizing zone.

11. A burner according to claim 9, wherein said at least one second auxiliary combustible gas flame hole comprises a plurality of second auxiliary combustible gas flame holes in a plurality of groups divided along the axial direction of said second flame stabilizing zone.

12. A burner according to claim 9, wherein said first and second flame stabilizing zones and said combustion chambers are of a cylindrical shape and have substantially same diameter.

13. A burner according to claim 9, wherein a pipe or a hole for directly viewing combustion flames is disposed upstream of the combustion flames in said flame stabilizing zone or said combustion chamber and a UV sensor is provided for detecting the combustion flames through said pipe or said hole.

14. A burner according to claim 1, wherein a mixer positioned outside of a supply unit for he auxiliary combustible agent is provided for mixing an oxygen-containing gas from an oxygen-containing gas supply line and a fuel gas from a fuel gas supply line, and supplying the gases to said combustion chamber, in which the supplied gases are combusted to produce combustion flames.

15. A burner according to claim 1, wherein a flow speed accelerating means is disposed in said waste gas chamber for increasing flow speed of a combustible waste gas to a level equal to or higher than combustion speed of the combustible waste gas.

* * * * *